(12) United States Patent
Aman et al.

(10) Patent No.: US 8,174,946 B2
(45) Date of Patent: May 8, 2012

(54) OPTICAL DISK APPARATUS AND METHOD OF CONTROLLING OPTICAL DISK APPARATUS

(75) Inventors: Yasutomo Aman, Kanagawa (JP); Nobuaki Onagi, Kanagawa (JP); Shozo Murata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 12/222,447

(22) Filed: Aug. 8, 2008

(65) Prior Publication Data
US 2009/0040896 A1 Feb. 12, 2009

Related U.S. Application Data

(60) Continuation of application No. 11/598,785, filed on Nov. 14, 2006, now Pat. No. 7,428,199, which is a division of application No. 10/347,291, filed on Jan. 21, 2003, now Pat. No. 7,164,629.

(30) Foreign Application Priority Data

Jan. 22, 2002 (JP) ................................ 2002-012717
Jun. 20, 2002 (JP) ................................ 2002-180095
Jun. 27, 2002 (JP) ................................ 2002-187360
Aug. 20, 2002 (JP) ................................ 2002-239015

(51) Int. Cl.
*G11B 7/00* (2006.01)
*G11B 27/36* (2006.01)
(52) U.S. Cl. ................. 369/53.18; 369/44.32; 369/53.23
(58) Field of Classification Search .................. 720/651, 720/688, 692
See application file for complete search history.

(56) References Cited

U.S. PATENT DOCUMENTS

| 4,661,875 | A | * | 4/1987 | Kinjo ............................ 360/133 |
| 4,734,809 | A | | 3/1988 | Inuma et al. |
| 5,012,463 | A | | 4/1991 | Farnsworth et al. |
| 5,062,020 | A | | 10/1991 | Osanai |
| 6,292,453 | B1 | | 9/2001 | Ichimura et al. |
| 6,317,402 | B1 | | 11/2001 | Huang et al. |
| 6,468,618 | B1 | | 10/2002 | Murata et al. |
| 6,479,121 | B1 | | 11/2002 | Miura et al. |
| 6,548,137 | B2 | | 4/2003 | Ito et al. |
| 6,704,164 | B1 | | 3/2004 | Hiraoka |

(Continued)

FOREIGN PATENT DOCUMENTS

EP 1 109 156 A2 6/2001

(Continued)

*Primary Examiner* — Mohammad Ghayour
*Assistant Examiner* — Carl Adams
(74) *Attorney, Agent, or Firm* — Dickstein Shapiro LLP

(57) ABSTRACT

An optical disk apparatus includes a rotary driving unit rotating an optical disk which is flexible, an optical pickup irradiating light upon a recording surface of the optical disk on which writing/reading of information is performed, a stabilizing unit stabilizing vibration of the optical disk in a rotary axial direction by using pressure difference of air flow at least on a portion where writing/reading is performed, and being disposed on a side of the optical disk opposite to a side on which the recording surface is provided, and a control-adjustment unit analyzing a value of a tracking error signal of the optical disk obtained by scanning along a groove of the optical disk with use of the optical pickup, comparing the analyzed value of the tracking error signal of the optical disk and a value priorly obtained by scanning along a groove of a standard disk prepared beforehand, and adjusting a positional relation between the optical disk and the stabilizing member in a three dimensional space according to the result of the comparison.

15 Claims, 21 Drawing Sheets

U.S. PATENT DOCUMENTS

| | | |
|---|---|---|
| 6,766,522 B1 | 7/2004 | Song et al. |
| 2001/0055254 A1 | 12/2001 | Kishimoto et al. |
| 2002/0060964 A1* | 5/2002 | Park .................. 369/53.19 |
| 2002/0098445 A1 | 7/2002 | Harigaya et al. |
| 2002/0110063 A1 | 8/2002 | Yamada et al. |
| 2002/0145963 A1 | 10/2002 | Narumi et al. |
| 2002/0155248 A1 | 10/2002 | Ito et al. |
| 2002/0160306 A1 | 10/2002 | Hanaoka et al. |
| 2002/0186636 A1 | 12/2002 | Onagi et al. |
| 2003/0003395 A1 | 1/2003 | Yuzurihara et al. |
| 2003/0048717 A1* | 3/2003 | Lee et al. ............ 369/53.18 |
| 2003/0107979 A1* | 6/2003 | Kim et al. ........... 369/112.07 |

FOREIGN PATENT DOCUMENTS

| | | |
|---|---|---|
| JP | 50-14216 | 2/1975 |
| JP | 61-227234 | 10/1986 |
| JP | 62-047864 | 3/1987 |
| JP | 63-164064 | 7/1988 |
| JP | 63-261536 | 10/1988 |
| JP | 64-035719 | 2/1989 |
| JP | 2-10568 | 1/1990 |
| JP | 03-137830 | 6/1991 |
| JP | 05-234241 | 9/1993 |
| JP | 05-325237 | 12/1993 |
| JP | H07-6956 | 1/1995 |
| JP | 07105657 | 4/1995 |
| JP | 08-212568 | 8/1996 |
| JP | 09-080298 | 3/1997 |
| JP | 10-188301 | 7/1998 |
| JP | 10-308059 | 11/1998 |
| JP | 2001-202747 | 7/2001 |
| JP | 2001-307341 | 11/2001 |
| JP | 2001-319352 | 11/2001 |
| JP | 2001-344790 | 12/2001 |
| JP | 2002-050063 | 2/2002 |

* cited by examiner

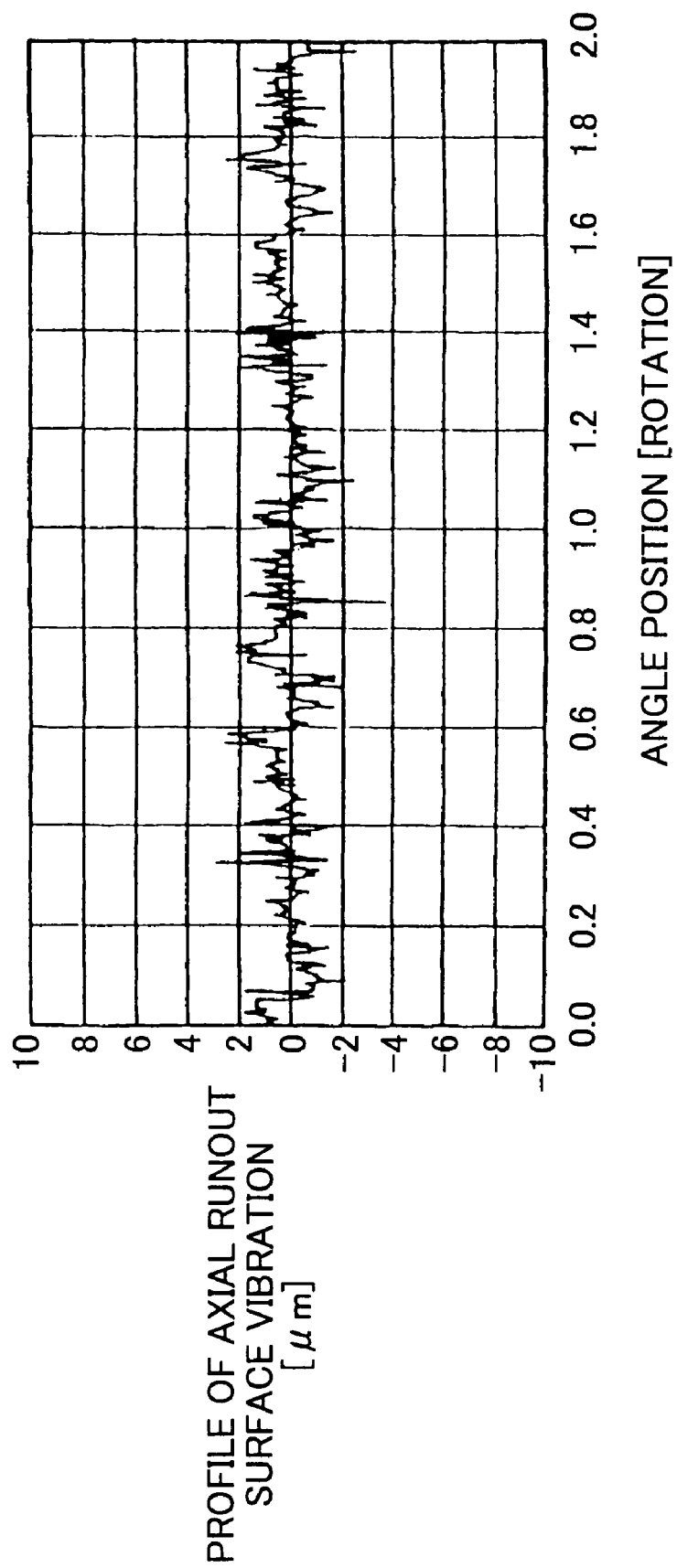

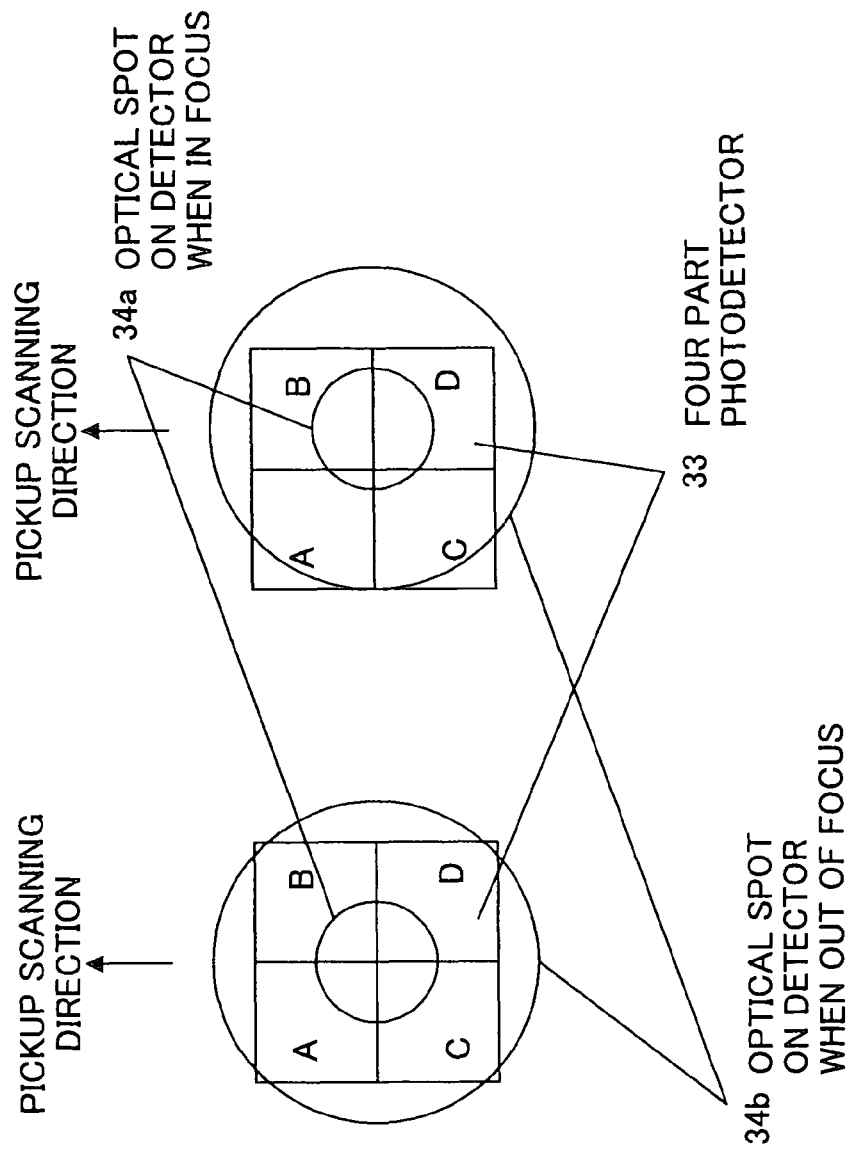

OPTICAL DISK APPARATUS AND METHOD OF CONTROLLING OPTICAL DISK APPARATUS

This application is a continuation application of U.S. application Ser. No. 11/598,785, filed on Nov. 14, 2006 now U.S. Pat. No. 7,428,199, which is a divisional application of U.S. application Ser. No. 10/347,291, filed on Jan. 21, 2003, now issued as U.S. Pat. No. 7,164,629 (issued Jan. 16, 2007), which is hereby incorporated herein by reference in its entirety.

BACKGROUND OF THE INVENTION

1. Field of the Invention

The present invention generally relates to an optical disk apparatus using a flexible sheet-like optical disk as an optic information recording medium and having a stabilizing unit therein which stabilizes surface vibration in a rotary axial direction of the optical disk by using pressure difference of air flow at a portion of the optical disk at which writing/reading is performed, and a method of controlling the optical disk apparatus, and particularly relates to a technique for adjusting a positional relation between the optical disk and the stabilizing member.

2. Description of the Related Art

Optical disks are demanded to store mass digitized data in response to, for example, the recent digitization of television broadcasting. A basic method of improving recording density on the optical disks is to reduce the diameter of a beam spot used for recording/reproducing information onto/from the optical disk.

For this reason, it is effective to shorten the wavelength of light used for recording/reproduction, and also, it is effective to enlarge the numerical aperture NA of an objective lens. As for the wavelength of light, the wavelength of approximately 650 nm of red light is used on a DVD (digital versatile disk) while 780 nm of near infrared light is used on a CD (compact disk). Recently, a semiconductor laser of blue-violet light has been developed and it is expected that a laser light of approximately 400 nm will be used.

The objective lens for a CD has less than 0.5 NA while the objective lens for a DVD has approximately 0.6 NA. The numerical aperture (NA) is demanded to be enlarged further to 0.7 or more in the future. However, enlarging NA of the objective lens and shortening the wavelength of light may result to an increase in influence of aberration in a case where applied light is weakened. Therefore, tilt margin of the optical disk may decrease. Moreover, since the depth of focus becomes smaller by enlarging NA, it will be necessary to increase focus servo accuracy of the optical disk apparatus.

Furthermore, since the distance between the objective lens and recording surface of an optical disk becomes shorter by using the objective lens of high NA, the objective lens and optical disk may collide before the focus servo becomes fully effective during the start-up period, unless surface vibration or axial runout on the disk is sufficiently controlled.

"O PLUS E" (vol. 20, No. 2, page 183) proposes an example of a large-capacity optical disk drive system having a short wavelength and high NA, in which a recording film is formed on a substrate having an equal thickness and an equal rigidity as a CD, and light for recording/reproducing is allowed to pass not through the substrate but through a thin cover layer for recording/reproducing on/from the recording film.

Japanese laid-open patent publication No. 7-105657 and Japanese laid-open patent publication No. 10-308059 disclose a method of stabilizing surface vibration on an optical disk by rotating a flexible optical disk on a specially provided stabilization plate having a plane surface.

However, with the aforementioned conventional art where the substrate of the optical disk is formed with a rigid body, the optical disk is required to be molded with extreme accuracy for reducing surface vibration and tilt of the high speed rotating disk, and furthermore, the coating of the record film is required to be performed at low temperature for preventing thermal deformation. Such requirements may reduce the yield of products, which may then result to cost rise of optical disks.

Furthermore, with the method of rotating the flexible optical disk on the stabilization plate disclosed in Japanese laid-open patent publication No. 10-308059, rotating the optical disk on a simple plane surface causes the optical disk and the stabilization plate to contact and slide against each other. As a result, the optical disk vibrates to thereby cause surface vibration at high frequency. The surface vibration at high frequency often falls in a frequency range for which mechanical focus servo control cannot handle, and therefore, residual servo error cannot be sufficiently eliminated.

Furthermore, surface vibration due to mutual sliding of the optical disk and objective lens causes creation of dirt/dust, and leads to various errors. Particularly, in Japanese laid-open patent publication No. 7-105657 where the record film is positioned on the side facing the stabilization plate, the mutual sliding also causes damage upon the optical disk, and directly results to error in recording/reproducing.

In solving the foregoing problems, Japanese patent application No. 2001-228943 discloses an invention where a stabilization guide member is not disposed in a manner facing the entire surface of a recording layer of the optical disk. The stabilization guide member has a cylindrical shape in which a side thereof facing the optical disk is shaped as a circular arc. The stabilization guide member is positioned at a portion where air force serves to stabilize surface vibration, and furthermore, areas that are not affected from the air force (space portions having no stabilizing guide member disposed thereat) are provided on the upstream side and downstream side of said portion stabilizing surface vibration. Accordingly, repulsive force otherwise occurring in the disk can be effectively reduced at said portion since each of said areas positioned before and behind said portion serves as an "escape" which absorbs (or relieves) the repulsive force. Therefore, an increase in the stabilizing effect using air force can be achieved.

With such invention, surface vibration of the flexible disc can be reliably controlled, recording can be performed with high density, and problems such as sliding contact against the objective lens can be prevented. Such invention, however, needs to overcome a critical problem of precisely matching the position of the focal point of the optical pickup with the position for stabilizing surface vibration.

Furthermore, Japanese patent application No. 2001-284299 discloses an invention serving to adjust the position for stabilizing surface vibration by controlling the position and the tilt of the stabilization guide, and also serving to match the position of the focal point of the optical pickup with the position for stabilizing surface vibration by measuring the gap between the stabilization guide and the optical disk with use of a gap sensor such as an electrostatic capacity type displacement sensor.

Nevertheless, employing a gap sensor such as the electrostatic capacity type displacement sensor is too costly and is unrealistic to be applied to a typical, widely used optical disk drive.

Meanwhile, Japanese patent application No. 2002-12717 discloses an invention serving to control and adjust the positional relation between a stabilizing member and an optical disk according to a result of a detected tracking error signal so that a focus position of an optical pickup and a surface vibration stabilizing position would match with each other.

Although this invention allows the focus position of an optical pickup and the surface vibration stabilizing position to satisfactorily match with each other, the use of this invention is limited to a case where a tracking error signal such as a push-pull signal is detectable in a state where a focus servo is switched off, and is unable to be used when the focus servo is switched on.

SUMMARY OF THE INVENTION

It is a general object of the present invention to provide an optical disk apparatus and a method of controlling an optical disk apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical disk apparatus and a method of controlling an optical disk apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical disk apparatus, which includes a rotary driving unit rotating an optical disk which is flexible, an optical pickup irradiating light upon a recording surface of the optical disk on which writing/reading of information is performed, a stabilizing unit stabilizing vibration of the optical disk in a rotary axial direction by using pressure difference of air flow at least on a portion where writing/reading is performed, and being disposed on a side of the optical disk opposite to a side on which the recording surface is provided, and a control-adjustment unit analyzing a value of a tracking error signal of the optical disk obtained by scanning along a groove of the optical disk with use of the optical pickup, comparing the analyzed value of the tracking error signal of the optical disk and a value priorly obtained by scanning along a groove of a standard disk prepared beforehand, and adjusting a positional relation between the optical disk and the stabilizing member in a three dimensional space according to the result of the comparison. Thus structured, the state of surface vibration of the optical disk positioned opposite to the optical pickup can be precisely determined according to tracking error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, a simple and inexpensive optical disk apparatus can be provided since no particular measuring unit (e.g. electrostatic capacity type displacement sensor) for directly measuring the amount of surface vibration is necessary.

In the aforementioned optical disk apparatus, a groove width, a groove depth, a groove pitch, and a disk surface reflectance of the standard disk each have a value falling within a range from 90% to 110% in comparison with a groove width, a groove depth, a groove pitch, and a disk surface reflectance of the optical disk, respectively. Accordingly, a precise basic data for comparing and analyzing can be provided, to thereby allow simple and sure adjustment of the positional relation between the optical disk and the stabilizing member.

In the aforementioned optical disk apparatus, the optical pickup obtains the tracking error signal by scanning along the groove of the optical disk in a focused state with respect to the standard disk. Accordingly, a tracking error signal of maximum amplitude can be obtained, to thereby enable sure and precise judgment by referring to the tracking error signal as a standard for comparison and analysis.

In the aforementioned optical disk apparatus, the focused state has a focus error ranging between plus 0.1 micrometer and minus 0.1 micrometer.

In the aforementioned optical disk apparatus, the control-adjustment unit adjusts the positional relation between the optical disk and the stabilizing member in a three dimensional space so that the maximum amplitude of the tracking error signal obtained from one rotation of the optical disk becomes 50% or more with respect to the maximum amplitude of the tracking error signal obtained from one rotation of the standard disk. Thereby, the positional relation between the optical disk and the stabilizing member can be adjusted within a suitable range.

In the aforementioned optical disk apparatus the control-adjustment unit adjusts the positional relation between the optical disk and the stabilizing member in a three dimensional space so that the maximum amplitude of an envelope of the tracking error signal obtained from one rotation of the optical disk becomes 25% or less with respect to the maximum amplitude of the tracking error signal obtained from one rotation of the standard disk. Thereby, the positional relation between the optical disk and the stabilizing member can also be adjusted within a suitable range.

In the aforementioned optical disk apparatus, the control-adjustment unit adjusts the positional relation between the optical disk and the stabilizing member in a three dimensional space so that the maximum amplitude of an envelope of the tracking error signal obtained from one rotation of the optical disk becomes 25% or less with respect to the maximum amplitude of the tracking error signal obtained from one rotation of the optical disk. Thereby, the positional relation between the optical disk and the stabilizing member can also be adjusted within a suitable range.

In the aforementioned optical disk apparatus the control-adjustment unit further adjusts the positional relation between the optical disk and the stabilizing member in a three dimensional space so that the maximum amplitude of an envelope of the tracking error signal obtained from one rotation of the optical disk becomes 25% or less with respect to the maximum amplitude of the tracking error signal obtained from one rotation of the standard disk, or further adjusts the positional relation between the optical disk and the stabilizing member in a three dimensional space so that the maximum amplitude of an envelope of the tracking error signal obtained from one rotation of the optical disk becomes 25% or less with respect to the maximum amplitude of the tracking error signal obtained from one rotation of the optical disk. Thereby, the positional relation between the optical disk and the stabilizing member can also be adjusted within a suitable range.

The aforementioned optical disk apparatus further includes a shifting mechanism which shifts a position of the optical disk and/or a position of the stabilizing member according to a signal transmitted from the control-adjustment unit for adjusting the positional relation between the optical disk and the stabilizing member.

The present invention also provides a method of controlling an optical disk apparatus, including the steps of rotating an optical disk which is flexible, irradiating light from an optical pickup to a recording surface of the optical disk on which writing/reading of information is performed, stabilizing vibration of the optical disk occurring in a rotary axial direction with a stabilizing member by using pressure difference of air flow at least on a portion where writing/reading is performed, analyzing a value of a tracking error signal of the optical disk obtained by scanning along a groove of the optical disk with use of the optical pickup, comparing the analyzed value of the tracking error signal of the optical disk and a value of a tracking error signal priorly obtained by scanning along a groove of a standard disk prepared beforehand, and adjusting a positional relation between the optical disk and the stabilizing member in a three dimensional space according to the result of comparison. With such method, the state of surface vibration of the optical disk positioned opposite to the optical pickup can be precisely determined according to tracking error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, a simple and inexpensive optical disk apparatus can be provided since no particular measuring unit (e.g. electrostatic capacity type displacement sensor) for directly measuring the amount of surface vibration is necessary.

The present invention also provides a method of controlling an optical disk apparatus, including the steps of rotating an optical disk which is flexible, irradiating light from an optical pickup to a recording surface of the optical disk on which writing/reading of information is performed, stabilizing vibration of the optical disk occurring in a rotary axial direction with a stabilizing member by using pressure difference of air flow at least on a portion where writing/reading is performed, analyzing a value of a tracking error signal of the optical disk obtained by scanning along a groove of the optical disk with use of the optical pickup, predetermining standard conditions for adjusting the positional relation between the optical disk and the stabilizing member in a three dimensional space by scanning along the grooves of optical disks having different specifications, and adjusting the positional relation between the optical disk and the stabilizing member in a three dimensional space according to one of the predetermined standard conditions about a disk corresponding to the specification of the optical disk before adjustment according to the result of comparison. This method simplifies operation for adjustment and control, and also simplifies the process for calculation, to thereby provide a more simple and inexpensive optical disk apparatus.

The aforementioned method of controlling an optical disk apparatus, may further include the steps of predetermining standard conditions for adjusting the positional relation between the optical disk and the stabilizing member in a three dimensional space by scanning along the grooves of optical disks having different specifications, and roughly adjusting the positional relation between the optical disk and the stabilizing member in a three dimensional space according to one of the predetermined standard conditions about a disk corresponding to the specification of the optical disk before adjustment according to the result of comparison. With such method, the operation for adjustment and control can be more simple and faster.

In the aforementioned method of controlling an optical disk apparatus, a groove width, a groove depth, a groove pitch, and a disk surface reflectance of the standard disk each have a value falling within a range from 90% to 110% in comparison with a groove width, a groove depth, a groove pitch, and a disk surface reflectance of the optical disk, respectively. Accordingly, a precise basic data for comparing and analyzing can be provided, to thereby allow simple and sure adjustment of the positional relation between the optical disk and the stabilizing member.

In the aforementioned method of controlling an optical disk apparatus, the optical pickup obtains the tracking error signal by scanning along the groove of the optical disk in a focused state with respect to the standard disk. Accordingly, a tracking error signal of maximum amplitude can be obtained, to thereby enable sure and precise judgment by referring to the tracking error signal as a standard for comparison and analysis.

In the aforementioned method of controlling an optical disk apparatus, the focused state has a focus error ranging between plus 0.1 micrometer and minus 0.1 micrometer.

In the aforementioned method of controlling an optical disk apparatus, the positional relation between the optical disk and the stabilizing member in a three dimensional space is adjusted so that the maximum amplitude of the tracking error signal obtained from one rotation of the optical disk becomes 50% or more with respect to the maximum amplitude of the tracking error signal obtained from one rotation of the standard disk. Thereby, the positional relation between the optical disk and the stabilizing member can be adjusted within a suitable range.

In the aforementioned method of controlling an optical disk apparatus, the positional relation between the optical disk and the stabilizing member in a three dimensional space is adjusted so that the maximum amplitude of an envelope of the tracking error signal obtained from one rotation of the optical disk becomes 25% or less with respect to the maximum amplitude of the tracking error signal obtained from one rotation of the standard disk. Thereby, the positional relation between the optical disk and the stabilizing member can be adjusted within a suitable range.

In the aforementioned method of controlling an optical disk apparatus, the positional relation between the optical disk and the stabilizing member in a three dimensional space is adjusted so that the maximum amplitude of an envelope of the tracking error signal obtained from one rotation of the optical disk becomes 25% or less with respect to the maximum amplitude of the tracking error signal obtained from one rotation of the optical disk. Thereby, the positional relation between the optical disk and the stabilizing member can be adjusted within a suitable range.

In the aforementioned method of controlling an optical disk apparatus, the positional relation between the optical disk and the stabilizing member in a three dimensional space is further adjusted so that the maximum amplitude of an envelope of the tracking error signal obtained from one rotation of the optical disk becomes 25% or less with respect to the maximum amplitude of the tracking error signal obtained from one rotation of the standard disk, or further adjusted so that the maximum amplitude of an envelope of the tracking error signal obtained from one rotation of the optical disk becomes 25% or less with respect to the maximum amplitude of the tracking error signal obtained from one rotation of the optical disk. Thereby, the positional relation between the optical disk and the stabilizing member can be adjusted within a suitable range.

According to another aspect of the present invention, an optical disk apparatus, includes a rotary driving unit rotating an optical disk which is flexible, an optical pickup irradiating light upon a recording surface of the optical disk on which writing/reading of information is performed, a stabilizing unit stabilizing vibration of the optical disk in a rotary axial direction with pressure difference of air flow at least on a portion where writing/reading is performed, and being disposed on a side of the optical disk opposite to a side on which the recording surface is provided, and a control-adjustment unit which sets a focus position of the optical pickup substantially at a center of a range of fluctuation within which the optical disk fluctuates in a rotary axial direction, analyzing a focus error signal detected from the optical pickup in a state where a tracing unit is not driven, and adjusting a positional relation between the optical disk and the stabilizing unit in a three dimensional space according to a value obtained from analyzing the detected focus error signal. Thus structured, the state of surface vibration of the optical disk positioned opposite to the optical pickup can be precisely determined according to focus error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, a simple and inexpensive optical disk apparatus can be provided since no particular measuring unit (e.g. electrostatic capacity type displacement sensor) for directly measuring the amount of surface vibration is necessary.

In the aforementioned optical disk apparatus, the control-adjustment unit adjusts the positional relation between the optical disk and the stabilizing unit in a three dimensional space such that an amplitude of a surface of the optical disk is no more than a predetermined standard value when a maximum amplitude of the focus error signal corresponding to a single rotation of the optical disk is converted into said amplitude of a surface of the optical disk. Therefore, surface vibration occurring on the surface of the optical disk toward the side of the optical pickup can be adjusted to an amount which is no more than a prescribed amount.

In the aforementioned optical disk apparatus, the standard value is set according to a rotation count of the optical disk, and a radial position of the optical disk at which recording/reproducing is performed, wherein the standard value is greater than a surface vibration amount created at a point where surface vibration of the optical disk is optimally stabilized by the stabilizing unit, wherein the standard value is 20 micrometers or less. Accordingly, a sure and precise judgment can be provided by referring to the standard value. That is, by controlling the amount of surface vibration to a value of 20 micrometers or less, the objective lens of the optical pickup and the optical disk can be prevented from colliding with each other even in a case where an optical pickup of high NA (e.g. DVR of NA 0.85) having a narrow work distance of approximately 0.05 mm to 0.3 mm. Furthermore, by setting the value of the bottom limit of the amount of surface vibration to an actual value of the optical disk, control-adjustment system can be prevented from functioning unsteadily.

The aforementioned optical disk apparatus further includes a shifting unit for shifting at least one of a position of the optical disk and a position of the stabilizing unit according to a signal transmitted from the control-adjustment unit for adjusting the positional relation between the optical disk and the stabilizing unit.

The present invention also provides a method of controlling an optical disk apparatus, including the steps of rotating an optical disk which is flexible, irradiating light from an optical pickup to a recording surface of the optical disk on which writing/reading of information is performed, stabilizing vibration of the optical disk occurring in a rotary axial direction with a stabilizing unit by pressure difference of air flow at least on a portion where writing/reading is performed, setting a focus position of the optical pickup substantially at a center of a range of fluctuation within which the optical disk fluctuates in a rotary axial direction, analyzing a focus error signal detected by the optical pickup in a state where a tracing unit is not driven, and adjusting a positional relation between the optical disk and the stabilizing unit in a three dimensional space according to a value obtained from analyzing the focus error signal. Therefore, the state of surface vibration of the optical disk positioned opposite to the optical pickup can be precisely determined according to focus error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, a simple and inexpensive optical disk apparatus can be provided since no particular measuring unit (e.g. electrostatic capacity type displacement sensor) for directly measuring the amount of surface vibration is necessary.

The present invention also provides a method of controlling an optical disk apparatus, including the steps of a) rotating an optical disk which is flexible, b) irradiating light from an optical pickup to a recording surface of the optical disk on which writing/reading of information is performed, c) stabilizing vibration of the optical disk occurring in a rotary axial direction with a stabilizing unit by pressure difference of air flow at least on a portion where writing/reading is performed, d) setting a focus position of the optical pickup substantially at a center of a range of fluctuation within which the optical disk fluctuates in a rotary axial direction, e) analyzing a focus error signal detected by the optical pickup in a state where a tracing unit is not driven, f) adjusting a positional relation between the optical disk and the stabilizing unit in a three dimensional space according to a value obtained from analyzing the focus error signal, g) predetermining standard conditions for three-dimensionally adjusting a positional relation between the optical disk and the stabilizing member by applying the steps a) to f) to various optical disks having different specifications, and h) applying the steps a) to f) to a given optical disk according to a corresponding one of the predetermined standard conditions. With such method, by predetermining the representative conditions for control with respect to the optical disk targeted for use, the position where the optical pickup focuses upon the optical disk and the position where surface vibration of the optical disk is stabilized can be precisely matched according to the said conditions for control. This method simplifies operation for adjustment and control, and also simplifies the process for calculation, to thereby provide a more simple and inexpensive optical disk apparatus.

In the aforementioned method of controlling an optical disk apparatus, the step h) includes a step of performing the steps a) to f) and a step of performing the steps a) to f)

according to the standard condition as fine adjustment. With such method, the operation for adjustment and control can be more simple and faster.

In the aforementioned method of controlling an optical disk apparatus, the positional relation between the optical disk and the stabilizing unit in a three dimensional space is adjusted such that an amplitude of a surface of the optical disk is no more than a predetermined standard value when a maximum amplitude of the focus error signal corresponding to a single rotation of the optical disk is converted into said amplitude of a surface of the optical disk Therefore, surface vibration occurring on the surface of the optical disk toward the side of the optical pickup can be adjusted to an amount which is no more than a prescribed amount.

In the aforementioned method of controlling an optical disk apparatus, the standard value is set in accordance with a rotation count of the optical disk and a radial position of the optical disk at which recording/reproducing is performed, wherein the standard value is greater than a surface vibration amount created at a point where surface vibration of the optical disk is optimally stabilized by the stabilizing unit, wherein the standard value is 20 micrometers or less. Accordingly, a sure and precise judgment can be provided by referring to the standard value. That is, by controlling the amount of surface vibration to a value of 20 micrometers or less, the objective lens of the optical pickup and the optical disk can be prevented from colliding with each other even in a case where an optical pickup of high NA (e.g. DVR of NA 0.85) having a narrow work distance of approximately 0.05 mm to 0.3 mm. Furthermore, by setting the value of the bottom limit of the amount of surface vibration to an actual value of the optical disk, control-adjustment system can be prevented from functioning unsteadily.

According to another aspect of the present invention, an optical disk apparatus, includes a rotary driving unit rotating an optical disk which is flexible, an optical pickup irradiating light upon a recording surface of the optical disk on which writing/reading of information is performed, a stabilizing unit stabilizing vibration of the optical disk in a rotary axial direction with pressure difference of air flow at least on a portion where writing/reading is performed, a focus servo drive unit which regulates the optical pickup to a position at which the optical pickup is in focus, and a control-adjustment unit analyzing a servo driving signal from the focus servo drive unit, and adjusting a positional relation between the optical disk and the stabilizing unit in a three dimensional space according to a value obtained by analyzing the servo driving signal from the focus servo drive unit. Thus structured, the state of surface vibration of the optical disk positioned opposite to the optical pickup can be precisely determined according to a waveform of the serving driving signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, such optical disk apparatus can correspond easily to high NA optical pickup having narrow defocus margin and narrow work distance since the value of surface vibration occurring at a position of the optical disk at which recording/reproducing is performed can be reduced to a considerably small value.

In the aforementioned optical disk apparatus, the control-adjustment unit adjusts the positional relation between the optical disk and the stabilizing unit in a three dimensional space such that a maximum amplitude of the servo driving signal is no more than a standard value which is predetermined. Therefore, surface vibration occurring on the surface of the optical disk toward the side of the optical pickup can be adjusted to an amount which is no more than a prescribed amount.

In the aforementioned optical disk apparatus, the standard value is set to fall within a range according to a relation between the amount of surface vibration and the amplitude of the servo driving signal, wherein the standard value is set according to a rotation count of the optical disk and a radial position of the optical disk at which recording/reproducing is performed, wherein the standard value is greater than a surface vibration amount created at a point where surface vibration of the optical disk is optimally stabilized by the stabilizing unit, wherein the standard value is 20 micrometers or less. Accordingly, a sure and precise judgment can be provided by referring to the standard value. That is, by controlling the amount of surface vibration to a value of 20 micrometers or less, the objective lens of the optical pickup and the optical disk can be prevented from colliding with each other even in a case where an optical pickup of high NA (e.g. DVR of NA 0.85) having a narrow work distance of approximately 0.05 mm to 0.3 mm. Furthermore, by setting the value of the bottom limit of the amount of surface vibration to an actual value of the optical disk, control-adjustment system can be prevented from functioning unsteadily.

The aforementioned optical disk apparatus further includes a shifting unit for shifting at least one of a position of the optical disk and a position of the stabilizing unit according to a signal transmitted from the control-adjustment unit for adjusting the positional relation between the optical disk and the stabilizing unit.

The present invention also provides a method of controlling an optical disk apparatus, including the steps of rotating an optical disk which is flexible, irradiating light from an optical pickup to a recording surface of the optical disk on which writing/reading of information is performed, stabilizing vibration of the optical disk occurring in a rotary axial direction with a stabilizing unit by pressure difference of air flow at least on a portion where writing/reading is performed, regulating the optical pickup with a focus servo drive unit such that the optical pickup is in a focus position, analyzing a servo driving signal from the focus servo drive unit, and adjusting a positional relation between the optical disk and the stabilizing unit in a three dimensional space according to a value obtained by analyzing the servo driving signal of the focus servo drive unit. Thereby, the state of surface vibration of the optical disk positioned opposite to the optical pickup can be precisely determined according to a waveform of the serving driving signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, such optical disk apparatus can correspond easily to high NA optical pickup having narrow defocus margin and narrow work distance since the value of surface vibration occurring at a position of the optical disk at which recording/reproducing is performed can be reduced to a considerably small value.

The present invention also provides a method of controlling an optical disk apparatus, comprising the steps of a) rotating an optical disk which is flexible, b) irradiating light from an optical pickup to a recording surface of the optical disk on which writing/reading of information is performed, c) stabilizing vibration of the optical disk occurring in a rotary axial direction with a stabilizing unit by pressure difference of air flow at least on a portion where writing/reading is performed, d) regulating the optical pickup with a focus servo drive unit such that the optical pickup is in a focus position, e) analyzing a servo driving signal from the focus servo drive unit, f) adjusting a positional relation between the optical disk and the stabilizing unit in a three dimensional space according to a value obtained by analyzing the servo driving signal of the focus servo drive unit, g) predetermining a standard condition for three-dimensionally adjusting a positional relation between the optical disk and the stabilizing member by applying the steps a) to f) to various optical disks having different specifications, and h) applying the steps a) to f) according to a given optical disk according to a corresponding one of the predetermined standard conditions. This method simplifies operation for adjustment and control, and also simplifies the process for calculation, to thereby provide a more simple and inexpensive optical disk apparatus.

In the aforementioned method of controlling an optical disk apparatus the step h) comprises a step of performing the steps a) to f) and a step of performing the steps a) to f) according to the standard condition as fine adjustment. With such method, the operation for adjustment and control can be more simple and faster.

In the aforementioned method of controlling an optical disk apparatus, the positional relation between the optical disk and the stabilizing unit in a three dimensional space is adjusted such that the maximum amplitude of the servo driving signal is no more than a standard value which is predetermined. Therefore, surface vibration occurring on the surface of the optical disk toward the side of the optical pickup can be adjusted to an amount which is no more than a prescribed amount.

In the aforementioned method of controlling an optical disk apparatus, the standard value is set to fall within a range according to a relation between the amount of surface vibration and the amplitude of the servo driving signal, wherein the standard value is set according to a rotation count of the optical disk and a radial position of the optical disk at which recording/reproducing is performed, wherein the standard value is greater than a surface vibration amount created at a point where surface vibration of the optical disk is optimally stabilized by the stabilizing unit, wherein the standard value is 20 micrometers or less. Accordingly, a sure and precise judgment can be provided with this method by referring to the standard value. That is, by controlling the amount of surface vibration to a value of 20 micrometers or less, the objective lens of the optical pickup and the optical disk can be prevented from colliding with each other even in a case where an optical pickup of high NA (e.g. DVR of NA 0.85) having a narrow work distance of approximately 0.05 mm to 0.3 mm. Furthermore, by setting the value of the bottom limit of the amount of surface vibration to an actual value of the optical disk, control-adjustment system can be prevented from functioning unsteadily.

According to another aspect of the present invention, an optical disk apparatus, includes a rotary driving unit rotating an optical disk which is flexible, an optical pickup irradiating light upon a recording surface of the optical disk on which writing/reading of information is performed, a stabilizing unit stabilizing vibration of the optical disk in a rotary axial direction with pressure difference of air flow at least on a portion where writing/reading is performed, a focus error detection unit which detects a focus error signal for use in servo control of a focus position of the optical pickup, and a control-adjustment unit analyzing a residual focus error signal that is detected by the focus error detection unit to indicate the focus error remaining despite the servo control, and adjusting a positional relation between the optical disk and the stabilizing unit in a three dimensional space according to a value obtained by analyzing the residual focus error signal. Thus structured, the state of surface vibration observed from the side of the optical pickup (i.e. the state of actual surface vibration which prevents steady recording/reproduction operation) can be precisely determined according to a waveform of the residual focus error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, such optical disk apparatus can correspond easily to high NA optical pickup having narrow defocus margin and narrow work distance since the value of surface vibration occurring at a position of the optical disk at which recording/reproducing is performed can be reduced to a considerably small value.

In the aforementioned optical disk apparatus, the control-adjustment unit adjusts the positional relation between the optical disk and the stabilizing unit in a three dimensional space such that an amplitude of a surface of the optical disk is no more than a predetermined standard value when a maximum amplitude of the residual focus error signal corresponding to a single rotation of the optical disk is converted into said amplitude of a surface of the optical disk. Therefore, surface vibration occurring on the surface of the optical disk toward the side of the optical pickup can be adjusted to an amount which is no more than a prescribed amount.

In the aforementioned optical disk apparatus, the standard value is a defocus margin predetermined for sufficiently performing recording/reproduction according to a combination of the optical pickup and the optical disk. Accordingly, a sure and precise judgment can be provided by referring to the standard value.

The optical disk apparatus further includes a shifting unit for shifting at least one of a position of the optical disk and a position of the stabilizing unit according to a signal transmitted from the control-adjustment unit for adjusting the positional relation between the optical disk and the stabilizing unit.

The present invention also provides a method of controlling an optical disk apparatus, including the steps of rotating an optical disk which is flexible, irradiating light from an optical pickup to a recording surface of the optical disk on which writing/reading of information is performed, stabilizing vibration of the optical disk occurring in a rotary axial direction with a stabilizing unit by pressure difference of air flow at least on a portion where writing/reading is performed, detecting a focus error signal with a focus error detection unit for use in servo control of a focus position of the optical pickup, analyzing a residual focus error signal that is detected by the focus error detection unit to indicate the focus error remaining despite the servo control, and adjusting a positional relation between the optical disk and the stabilizing unit in a three dimensional space according to a value obtained by analyzing the residual focus error signal. Thus structured, the state of surface vibration observed from the side of the optical pickup (i.e. the state of actual surface vibration which prevents steady recording/reproduction operation) can be precisely determined according to a waveform of the residual focus error signal, and the portion of the optical disk in which surface vibration is stabilized and the focus position of the optical disk which is focused by the optical pickup can be precisely matched by adjusting the positional relation between the optical disk and the stabilizing member, to thereby allow stable reproduction and/or recording at the position where there is little surface vibration. Furthermore, such optical disk apparatus can correspond easily to high NA optical pickup having narrow defocus margin and narrow work distance since the value of surface vibration occurring at a position of the optical disk at which recording/reproducing is performed can be reduced to a considerably small value.

The present invention also provides a method of controlling an optical disk apparatus, including the steps of a) rotating an optical disk which is flexible, b) irradiating light from an optical pickup to a recording surface of the optical disk on which writing/reading of information is performed, c) stabilizing vibration of the optical disk occurring in a rotary axial direction with a stabilizing unit by pressure difference of air flow at least on a portion where writing/reading is performed, d) detecting a focus error signal with a focus error detection unit for use in servo control of a focus position of the optical pickup, e) analyzing a residual focus error signal that is detected by the focus error detection unit to indicate the focus error remaining despite the servo control, f) adjusting a positional relation between the optical disk and the stabilizing unit in a three dimensional space according to a value obtained by analyzing the residual focus error signal, g) predetermining a standard condition for three-dimensionally adjusting a positional relation between the optical disk and the stabilizing member by applying the steps a) to f) to various optical disks having different specifications, and h) applying the steps a) to f) according to a given optical disk according to a corresponding one of the predetermined standard conditions. With such method, by predetermining the representative conditions for control with respect to the optical disk targeted for use, the position where the optical pickup focuses upon the optical disk and the position where surface vibration of the optical disk is stabilized can be precisely matched according to the said conditions for control. This method simplifies operation for adjustment and control, and also simplifies the process for calculation, to thereby provide a more simple and inexpensive optical disk apparatus.

In the aforementioned method of controlling an optical disk apparatus the step h) includes a step of performing the steps a) to f) and a step of performing the steps a) to f) according to the standard condition as fine adjustment. With such method, the operation for adjustment and control can be more simple and faster.

In the aforementioned method of controlling an optical disk apparatus, the positional relation between the optical disk and the stabilizing unit in a three dimensional space is adjusted such that the maximum amplitude of the residual focus error signal is no more than a standard value which is predetermined. Therefore, surface vibration occurring on the surface of the optical disk toward the side of the optical pickup can be adjusted to an amount which is no more than a prescribed amount.

In the aforementioned method of controlling an optical disk apparatus, the standard value is a defocus margin predetermined for sufficiently performing recording/reproduction according to a combination of the optical pickup and the optical disk. Accordingly, with this method, a sure and precise judgment can be provided by referring to the standard value.

Other objects and further features of the present invention will be apparent from the following detailed description when read in conjunction with the accompanying drawings.

BRIEF DESCRIPTION OF THE DRAWINGS

FIG. 5 shows a measured result of surface vibration of the optical disk of the present invention;

FIGS. 7A and 7B are explanatory views showing a state where a four part photo detector has received a reflected light subsequent to scanning an optical disk by irradiating light from an optical pickup to the optical disk according to the first, second, and third embodiment of the present invention;

DESCRIPTION OF THE PREFERRED EMBODIMENTS

In the following, embodiments of the present invention will be described with reference to the accompanying drawings.

Figure 1:
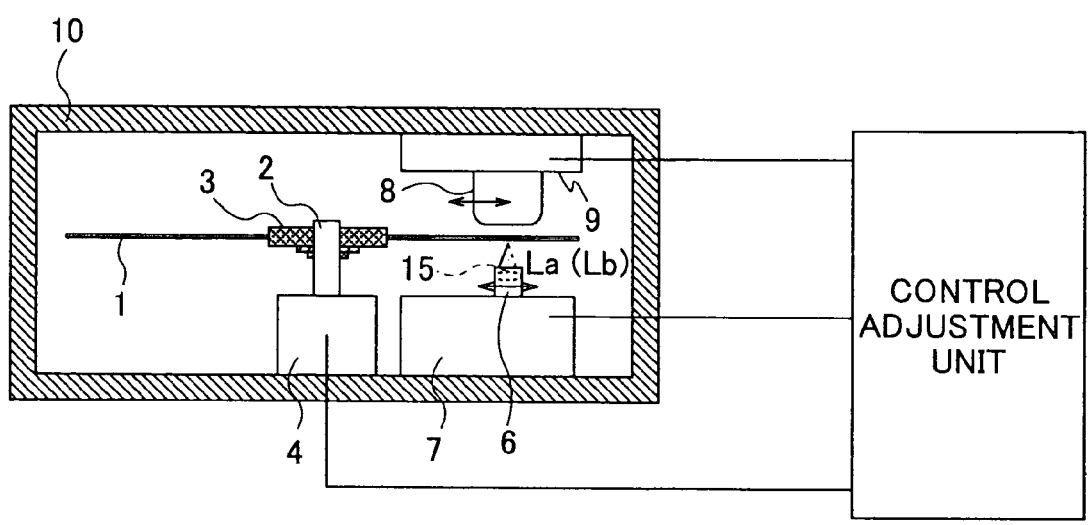
FIG. 1 is a schematic view showing an optical disk apparatus for explaining a basic structure of the present invention.

FIG. 1 shows a first embodiment of an optical disk apparatus for the present invention, in which numeral 1 denotes an optical disk having a flexible sheet-like form, numeral 2 denotes a spindle shaft holding a hub 3 of the optical disk 1, numeral 4 denotes a spindle motor performing rotation drive of the spindle shaft 2, numeral 6 denotes an optical pickup writing/reading information onto/from the optical disk 1, numeral 7 denotes a pickup positioning mechanism moving the optical pickup 6 along a radius direction of the optical disk 1, numeral 8 denotes a stabilizing member serving to prevent surface vibration of the optical disk 1 and being positioned on the opposite side from the optical pickup 6 having the optical disk 1 disposed therebetween, and numeral 9 denotes a stabilizing member positioning mechanism serving to move the stabilizing member 8 in a radius direction of the optical disk 1 in association with movement of the optical pickup 6. These respective members/components are housed in an apparatus body 10.

Figure 2A:
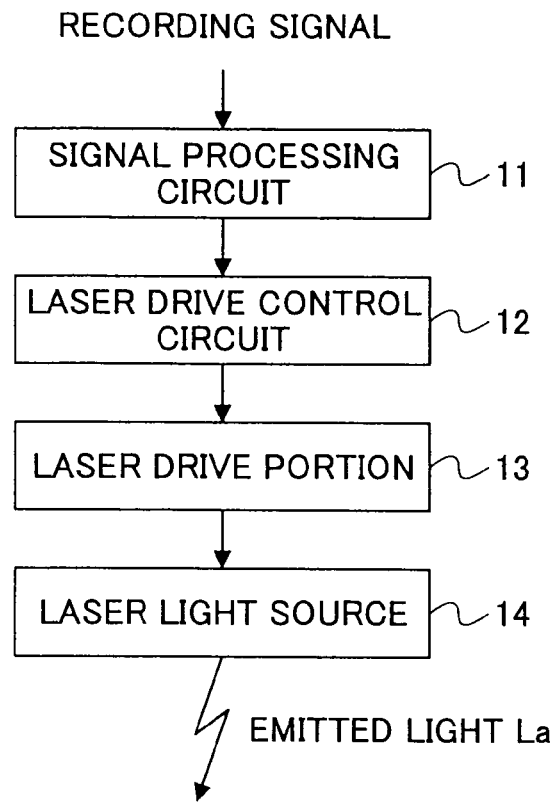
FIGS. 2A and 2B are views showing a recording unit and a reproducing unit included in an optical pickup of the present invention.
Figure 2B:
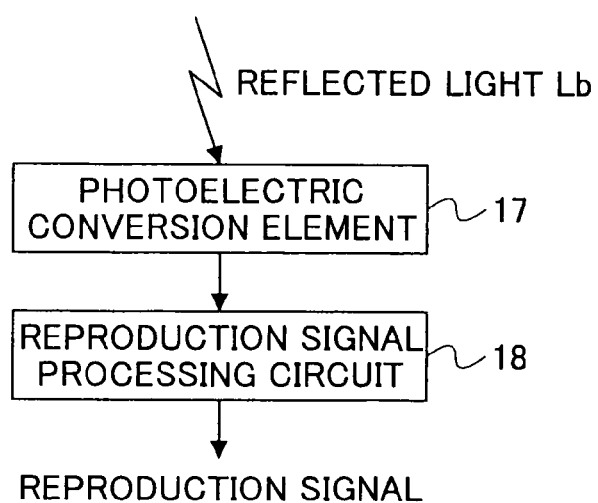

FIGS. 2A and 2B serve to explain a recording unit and a reproducing unit comprised in the optical pickup 6. In the recording unit shown in FIG. 2A, a signal processing circuit 11 performs digital signal processing, signal compression processing, etc. onto an input recording signal, and a laser drive control circuit 12 generates a laser drive control signal based on the output from the signal processing circuit 11. A laser drive portion 13 drives a laser light source 14 including a semiconductor laser etc. in response to the output from the laser drive control circuit 12. The laser light La of high emission energy emitted from the laser light source 14 is condensed by an objective lens 15 of the optical pickup 6 shown in FIG. 1, and is irradiated as an optical spot (laser spot) upon the recording surface of the optical disk 1, thereby allowing pits to be formed for recording information.

As for the reproducing unit, the optical pickup 6 includes, for example, a photoelectric conversion element 17 such as a photodiode and a reproduction signal processing circuit 18 as shown in FIG. 2B. Thereby, laser light at low energy is emitted from the laser light source 14 to the recording pits formed in the recording surface of the optical disk 1, and a reflected light Lb reflected therefrom is then received at the photoelectric conversion element 17 via the objective lens 15. Signal decompression processing etc. is then performed on the output from the photoelectric conversion element 17 in the reproduction signal processing circuit 18, to thereby generate a reproduction signal.

Figure 3:
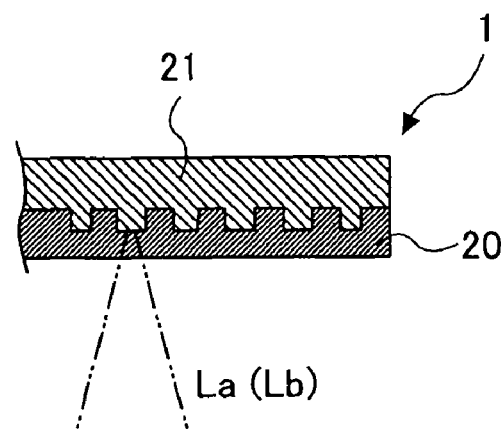
FIG. 3 is a partial cross-sectional view of a flexible sheet-like optical disk of the present invention.

FIG. 3 shows a cross-sectional view of a structure of the optical disk 1, in which the optical disk 1 is set onto a chuck portion of the spindle shaft 2 in a state where a recording layer 20 faces the objective lens 15 of the optical pickup 6, and a substrate 21 faces the stabilizing member 8.

An example of the optical disk 1 will now be described in detail. A thin sheet of approximately 0.1 mm is used for providing flexibility in the substrate. For example, heat transfer is performed onto a polyethylene terephthalate sheet with a thickness of 80 micrometers so as to form a stamper with grooves having a pitch of 0.6 micrometers and a width of 0.3 micrometers. Then, by means of sputtering, a sheet/Ag reflective layer is coated in an order of a 120 nm/($ZrO_2$—$Y_2O_3$)—$SiO_2$ layer, a 7 nm/AgInSbTeGe layer, a 10 nm/ZnS—$SiO_2$ layer, and a 25 nm/$Si_3N_4$ layer. The sheet is then spin-coated with UV resin, and is then cured by irradiation of ultraviolet-ray, to thereby form a transparent protective film of 5 micrometers. In means to enhance reflectance of the disk, the recording layer of the disk is further melted and crystallized with use of a laser light having a large diameter.

Stabilization of surface vibration caused upon the flexible sheet-like optical disk will now be described with reference to FIG. 4. The flexible optical disk 1 having the aforementioned configuration is rotated between the optical pickup 6 and the stabilizing member 8 when recording/reproducing is performed. A force inducing the optical disk 1 to become a straight/plane (referred as "self-stretching force" hereinafter) is created upon the rotating optical disk since the optical disk itself, though small, has some rigidity, and also since centrifugal force is caused from the rotation. Accordingly, based on Bernoulli's law, moving the stabilizing member 8 toward the optical disk 1 causes a pressure difference in air flow and creates a repellant force upon the optical disk 1. Consequently, surface vibration or axial runout (vibration in a direction of the disk rotation axis) created upon the optical disk 1 can be effectively reduced by balancing the self-stretching force of the optical disk 1 with respect to the repulsive force applied upon the optical disk 1 from the stabilizing member 8.

In this embodiment, the stabilizing member 8 is not to be faced against the entire surface of the recording layer 20. For example, as shown in FIG. 4, a stabilizing member 8 is formed having a cylindrical shape with a circular arc-like surface facing the optical disk 1. Accordingly, besides providing a portion A where surface vibration is stabilized by the air pressure effect (repellant force) applied from the stabilizing member 8 to the optical disk 1, a portion B and a portion C are provided on an upstream side and a downstream side of the portion A in a disk rotation direction, to thereby provide areas not subject to the air pressure effect (repellant force) applied from the stabilizing member 8 (empty space portion having no stabilizing member 8 disposed thereat). By providing portions for "escape (relieving)" fore and aft of the portion A where surface vibration is stabilized, repellant force from the optical disk 1 can be reduced at the portion A. Accordingly, such air pressure effect serves to provide greater stabilization.

Furthermore, the stabilizing member 8 is disposed toward a substrate 21 side (opposite to the side of the recording layer 20) of the optical disk 1. The light La and the light Lb for recording/reproduction is condensed on the recording layer 20, to thereby perform recording/reproduction. Meanwhile, the stabilizing member 8 performs stabilization on the substrate 21 side. Accordingly, even if the stabilizing member 8 were to slide and contact against the optical disk 1, the recording layer 20 would not be damaged, and, thus, does not result to recording/reproducing error. It is now to be noted that, under a certain condition, the stabilizing member 8 may be positioned on the side of the recording layer 20, and a laser light for recording/reproduction may be incident to the recording layer via the substrate 21. In such a case, forming a protective film (e.g. overcoat process) on the recording layer 20 would be effective for preventing the recording layer from being damaged. Moreover, the optical disk 1 usually bends in a convexed manner on the recording layer 20 side. This is due to the compression stress in the sputtered coating of the recording layer 20. Accordingly, applying the stabilizing member 8 upon the optical disk 1 in a pressing manner from the substrate 21 side of the optical disk 1 allows attracting force between the stabilizing member 8 and optical disk 1 to be stabilized effectively, and thereby, surface vibration on the optical disk 1 can be effectively compressed (eliminated).

Even if the optical disk 1 was to be damaged by sliding and contacting upon the stabilizing member 8, the damage would not affect the recording layer 20 and cause recording/reproducing error since the light La and the light Lb for recording/reproducing are applied directly upon the recording layer 20 side, which is the opposite side of the side of the portion A where surface vibration is stabilized. Further, since the light La and the light Lb for recording/reproducing does not pass through the substrate 21, the light La and the light Lb are free from the influence of damage of the substrate 21 and also are free from the optical property of the substrate 21. Therefore, the substrate 21 is not required to be transparent.

A further detailed description will now be made with reference to FIG. 4. In the configuration shown in FIG. 4, comprising members of the optical disk apparatus except for the stabilizing member 8 and the apparatus body are required to be separated approximately 1 mm or more from the optical disk 1 in a case where comprising members of the optical disk apparatus except for the stabilizing member 8, the apparatus body, or the optical disk 1 are housed inside a cartridge, so that such comprising members would not be subject to an effect owing to Bernoulli's law. However, as an exception, in a case where operating distance is short due to the use of an objective lens 15 having high NA, the objective lens 15 may be positioned approximately 0.05 mm to 0.3 mm from the optical disk 1.

Figure 4:
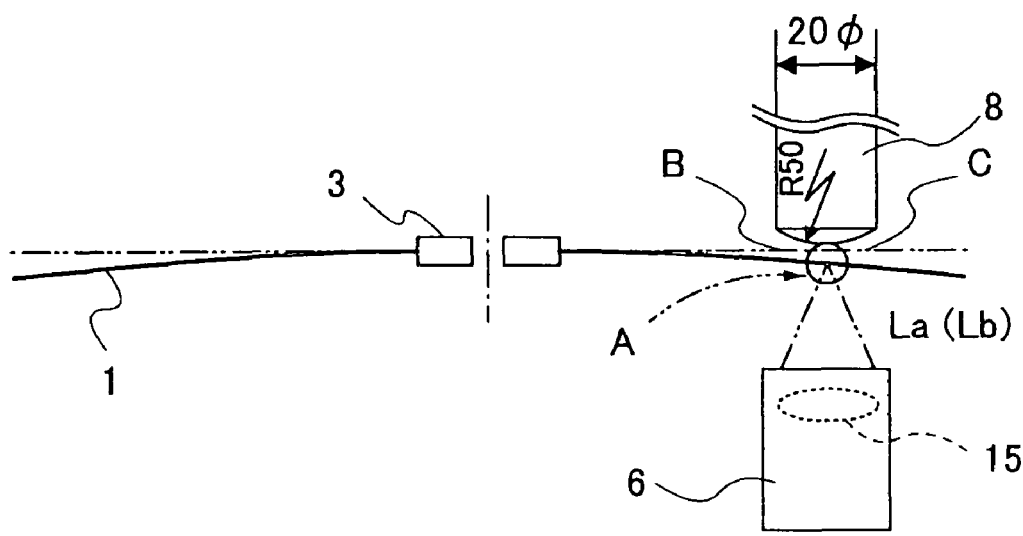
FIG. 4 is a view for explaining stabilization of a flexible sheet-like optical disk of the present invention.

Furthermore, FIG. 5 shows a measured result of the surface vibration the optical disk in the configuration of FIG. 4 in a case where the optical disk is rotated twice. In this experiment, the stabilizing member 8 has a curvature radius of 50 mm at a distal end thereof and a diameter of 20 mm. The optical disk 1 has an 80-micrometer PET (polyethylene terephthalate) sheet formed with a tracking groove of a 0.65 micrometer pitch, has a recording film thereof formed by sputtering, and has a diameter of 120 mm. The optical disk 1 was rotated at 2000 rpm and had a surface vibration thereof measured with a laser displacement measurement unit. The distance between the stabilizing member 8 and the optical disk 1 was set to approximately 5 micrometers.

No unusual vibration in the stabilizing member 8 was observed and no slide cracks were found on the optical disk 1. Therefore, it can be regarded that neither excess aerial floating nor sliding had occurred. The measured surface vibration of the optical disk 1 was approximately 5 micrometers. Therefore, taking into consideration that a typical rigid disk produces a surface vibration of 50 micrometers or more, it is evident that the surface vibration of the optical disk 1 is extremely small.

Table 1 summarizes the measured results of surface vibration according to ten rotations using the same measuring method described with reference to FIG. 5, in which an optical disk of this embodiment having a stabilizing member disposed upon a part on one side of the optical disk was compared with a conventional optical disk having a guide member disposed upon the entire surface of the optical disk.

TABLE 1

| TYPE OF STABILIZING MEMBER | WIDTH OF SURFACE VIBRATION (MICROMETERS) | VARIATION OF SURFACE VIBRATION (3σ, MICROMETERS) |
| --- | --- | --- |
| PRESENT EMBODIMENT | 11 | 2 |
| CONVENTIONAL ART (WITH GUIDE MEMBER DISPOSED ON ENTIRE SURFACE OF THE DISK) | 20 | 6 |

As apparent in Table 1, satisfactory performance in stabilizing surface vibration was obtained, in which the maximum width of surface vibration was approximately 11 micrometers and the variation of surface vibration was approximately 2 micrometers.

Such satisfactory stabilization of surface vibration can be performed in a case where the stabilizing member 8 is provided in the apparatus body and also in a case where the stabilizing member 8 is provided in a disk cartridge.

Further, experimentally, recording/reproducing was performed with the foregoing optical disk apparatus in which an optical pickup of 405 nm wavelength and 0.9 NA was employed. For example, the recording position on the optical disk was at the radius of 45 mm, and the shortest recording bit length was 0.12 micrometers, and random digital data was modulated according to 1-7RLL and was recorded there.

Further, jitter between basic clock signal and recording signal was less than 8% under conditions where linear recording speed is 10 m/s, and three-level modulation has a record peak power of 5 mW, an erase power of 2.6 mW, and a recording bottom power of 0.1 mW. Further, no particular unsteadiness on envelope of the recording signal occurred, and, focus and tracking were both performed stably. Although residual error on focus was observed both in recording and reproducing, the defocus value dropped to a value no more within ±0.12 micrometers. With a NA no less than 0.8, the defocus margin is very narrow, and is fractional compared to that of DVD. Therefore, defocus value is required to be controlled no more within ±0.2 micrometers. From this aspect, a sufficient stabilization in focus was achieved with this embodiment.

Defocus value was further evaluated in a case where the linear recording speed was raised to 20 m/s, and thereby resulted to a value no more within ±0.12 micrometers. On the other hand, an increase in surface vibration relative to resonance or the like, and an increase in defocus value are observed with a conventional disk with high rigidity in a case where linear speed is increased. Accordingly, it can be said that a superior result was obtained with this embodiment. This is due to the fact that the present invention uses air force for stabilizing surface vibration. Therefore, the more linear speed is increased, the stronger the stabilization effect becomes.

As a result of attempting to further improve the controlling method for stabilizing surface vibration of an optical disk, the inventors of the present invention had come to the following conclusions. First, tracking error signals can be detected without use of a focus servo since the foregoing type of optical disk apparatus can reduce surface vibration to a considerable amount at a portion of the sheet-like optical disk on a side proximal to the optical pickup. Furthermore, it has been discovered that the waveform of a detected tracking error signal correlate to the amount of surface vibration, and thereby the state of surface vibration of the sheet-like optical disk can be estimated by referring to the state of a detected tracking error signal (which is a new phenomenon never seen in the conventional field of optical disks). Furthermore, taking the foregoing phenomenon to advantage, surface vibration of the sheet-like optical disk occurring on a side toward the optical pickup can be controlled by monitoring and controlling of tracking error signals.

Figure 6A:
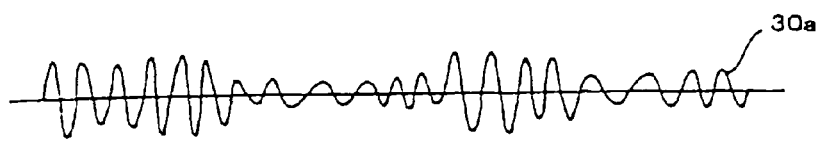
FIGS. 6A to 6C show waveforms of tracking error signals detected from a photodetector of a signal detecting system of an optical pickup in a state where a focus servo and a tracking servo are switched off according to the first, second, and third embodiment of the present invention.
Figure 6B:
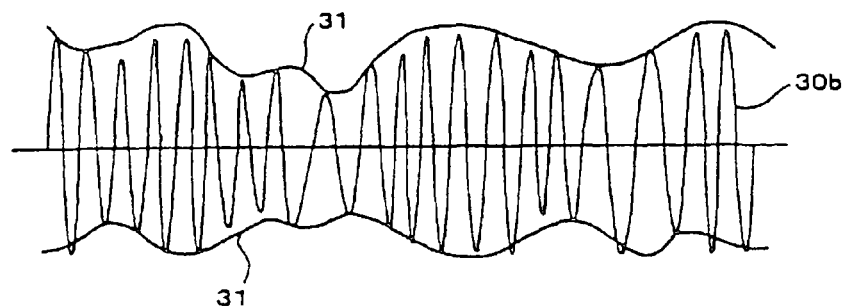
Figure 6C:
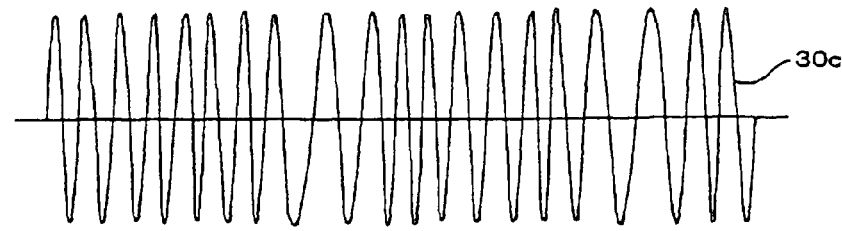

FIGS. 6A to 6C show waveforms of tracking error signals detected from a photodetector (described afterwards) of a signal detection system of the optical pickup 6 in a state where a focus servo and a tracking servo of the optical disc apparatus described in FIGS. 1 to 5 are switched off. It is to be noted that the term tracking error signal in the following description refers to a tracking error signal in a state where the focus servo and the tracking servo are switched off, unless particularly described as otherwise.

In FIGS. 6A to 6C, 30a to 30c denote a tracking error signal, respectively, and 31 denotes an envelope waveform of the tracking error signal. FIGS. 6A, 6B and 6C each show a state of adjusting the relative position between the sheet-like optical disk 1 and the stabilizing member 8, in which FIG. 6C shows a tracking error signal in a case where the amount of surface vibration on the side of the optical disk 8 facing the optical pickup 6 is set to 3 micrometers or less, FIG. 6B shows a tracking error signal in a case where the amount of surface vibration on the side of the optical disk 8 facing the optical pickup 6 is set to approximately 10 micrometers, and FIG. 6A shows a tracking error signal in a case where the amount of surface vibration on the side of the optical disk 8 facing the optical pickup 6 is set to approximately 20 micrometers.

A typical method of detecting a tracking error signal will be described. Although, a four part photo detector is given as an example as the photo detector of the signal detecting system for the optical pickup 6, other signal detecting systems may also be used as long as a signal, in response to deviation on the optical disk in the tracking direction, can be detected, and as long as deviation in focal position can be detected as increase and decrease of signal amplitude.

FIGS. 7A and 7B are explanatory views showing a state where a four part photo detector has received a reflected light subsequent to scanning the optical disk by irradiating light from the optical pickup 6 to the optical disk, in which a photo detector 33 has a light receiving surface divided into four areas A, B, C, and D. A small diameter (optical spot) 34a illustrates an optical spot of the reflected light in a focused state upon the optical disk 1, and a large diameter (optical spot) 34b illustrates an optical spot of the reflected light in a defocused state upon the optical disk 1. FIG. 7A illustrates the optical spots 34a and 34b of the reflected light reflected upon the photo detector in a case where the irradiated light is positioned within a groove the optical disk, and FIG. 7B illustrates the optical spots 34a and 34b of the reflected light reflected upon the photo detector in a case where the irradiated light is positioned deviating from the groove the optical disk. The tracking error signal is obtained by the difference between the sum of the signals corresponding to areas A and C of the photo detector 33 and the sum of the signals corresponding to areas B and D of the photo detector 33.

Since the deviation of the focal distance between the optical disk 1 and the optical pickup 6 is small when pickup for recording/reproducing is performed at the portion where surface vibration of the optical disk is stabilized, the optical disk apparatus of the present invention requires no dynamic following motion using a focus servo or the like, but requires only to adjust the static relative position between the optical pickup 6 and the optical disk 1 to thereby adjust and substantially match the optical spot to a focused position upon the photo detector 33 as shown in FIGS. 7A and 7B. The tracking error signal for such a case is shown in FIG. 6C.

Meanwhile, the portion subject to stabilization of surface vibration is restricted to a prescribed range, and therefore, surface vibration becomes greater as the farther the distance from the prescribed range becomes. Accordingly, in a case where the pickup position surpasses the stabilizing area, the optical spot on the photo detector 33 repeatedly focuses and defocuses (as shown in FIGS. 7A and 7B) in correspondence to the changes in movement on the side of the optical disk 1 toward the pickup. At the moment where the reflected light is defocused, the focal point would be blurred, and the strength of the light detected from the photo detector 33 would decrease. As a result, in such moment, the amplitude of the tracking error signal would decrease, and the tracking error signal would have a waveform as shown in FIG. 6B.

Furthermore, since the surface vibration at the pickup position of the optical disk 1 would further increase as the pickup position surpasses the surface vibration stabilizing range, the tracking error signal is unable to obtain a sufficient amplitude even at the moment where the reflected light is in focus, and the tracking error signal would therefore have a waveform as shown in FIG. 6A.

Since the foregoing type of optical disc apparatus exhibits a relation between the tracking error signal and the surface vibration at the pickup area of the optical disk, the surface vibration on the side of the optical disk toward the pickup can be detected and controlled by taking advantage of such relation.

As described above, the alternating waveform of the tracking error signal, which is obtained by traversing the groove of the optical disk 1, would have maximum amplitude when the focus error is zero (It is to be noted that the maximum of the tracking error signal is defined to be "when the focus error signal is theoretically zero").

An example of a method for controlling the surface vibration of an optical disk is described as follows. A sheet-like flexible optical disk used for the present optical disk apparatus is prepared as a standard disk (may be a disk formed from a glass substrate with no flexibility), that is, a disk having a groove width, a groove depth, a pitch size, and a reflectance which are no more than 90% to 110% compared to those of the aforementioned flexible optical disk. The standard disk is mounted to the optical disk apparatus, and the pickup of the optical pickup 6 is initiated, to thereby obtain a property analysis value (standard signal) derived by analyzing the property of the tracking error signal detected in a state where the focus error is within plus or minus 0.1 micrometer (precise focused state). The property analysis value (standard signal) is then stored and maintained inside a memory of the optical disk apparatus.

Then, the property analysis value already stored in the memory is compared with a property analysis value derived from analyzing a tracking error signal which is actually measured during the start of the optical disk apparatus, and the stabilizing member according to the compared result is then displaced with respect to the pickup area of the optical disk, to thereby control the surface vibration into a stable state.

The following are examples of a method for controlling the surface vibration of an optical disk with reference to property analysis value. ① Adjusting a positional relation between an optical disk and a stabilizing member within a three dimensional space, so that the maximum amplitude of a tracking error signal in a single rotation of a flexible sheet-like optical disk targeted for use would be 50% or more with respect to the maximum amplitude of a tracking error signal in a single rotation of said standard disk. ② Adjusting a positional relation between an optical disk and a stabilizing member within a three dimensional space, so that the maximum amplitude of an envelope of a tracking error signal in a single rotation of a flexible sheet-like optical disk targeted for use would be 25% or less with respect to the maximum amplitude of the tracking error signal in a single rotation of said standard disk. ③ Adjusting a positional relation between an optical disk and a stabilizing member within a three dimensional space, so that the maximum amplitude of an envelope of a tracking error signal in a single rotation of a flexible sheet-like optical disk targeted for use would be 25% or less with respect to the maximum amplitude of a tracking error signal in a single rotation of said flexible sheet-like optical disk targeted for use. ④ Employing the aforementioned method ① as a principle method and combining such method ① with the aforementioned methods ② or ③.

Figure 8:
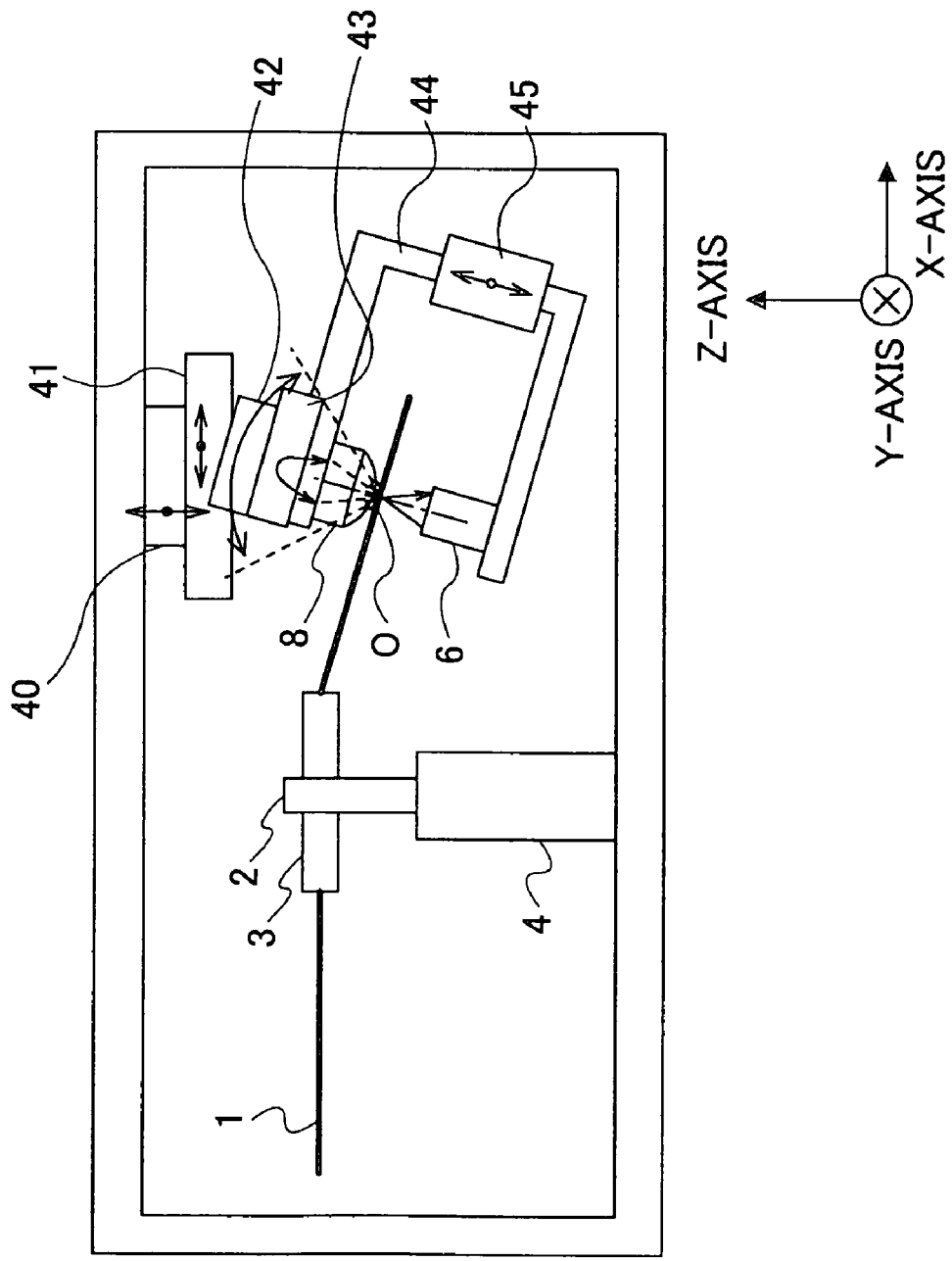
FIG. 8 is a schematic view showing an optical disk apparatus of the present invention.

FIG. 8 is a schematic view showing an embodiment of an optical disk apparatus according to the present invention. It is to be noted that corresponding members are denoted by corresponding numerals as of the foregoing description and detailed explanations thereof will be omitted.

In FIG. 8, 40 denotes a z-axis stabilizing member/pickup unit position control portion, 41 denotes an x-axis stabilizing member/pickup unit position control portion, 42 denotes an x-axis stabilizing member/pickup unit tilt angle control portion, 43 denotes a y-axis stabilizing member/pickup unit tilt angle control portion, 44 denotes a stabilizing member/pickup unit casing body which holds the stabilizing member 8 and the optical pickup 6 therein, and 45 denotes a stabilizing member/pickup space adjusting portion which adjusts the space between the stabilizing member 8 and the optical pickup 6. The x-axis stabilizing member/pickup unit tilt angle control portion 42 and the y-axis stabilizing member/pickup unit tilt angle control portion 43 are mechanisms capable of adjusting the tilt angle in a case where the surface center position O of the stabilizing member 8 serve as the rotary center. The optical pickup 6 is fixed to the stabilizing member/pickup unit casing body 44 for allowing a laser light to be always perpendicular and incident upon the surface center position O of the stabilizing member 8. It is to be noted that the sheet-like optical disk 1 and the stabilizing member 8 are used in the same manner as described manner.

In this embodiment, a standard disk having a groove width, a groove depth, a pitch size, and a reflectance which are no more than 90% to 110% compared to those of the sheet-like optical disk 1 is set on an apparatus having the same standard as that of the aforementioned optical disk apparatus, and is then subject to pickup of the optical pickup 6, so as to derive beforehand the maximum amplitude of a tracking error signal in a single rotation of the standard disk under a condition where the focus error is within plus or minus 0.1 micrometer. Accordingly, the derived value, which serves as a standard value A, is stored and maintained inside a CPU (Central Processing Unit, not shown) which serves as a control adjustment unit for controlling each portion mounted on the optical disk apparatus of this embodiment.

Figure 9:
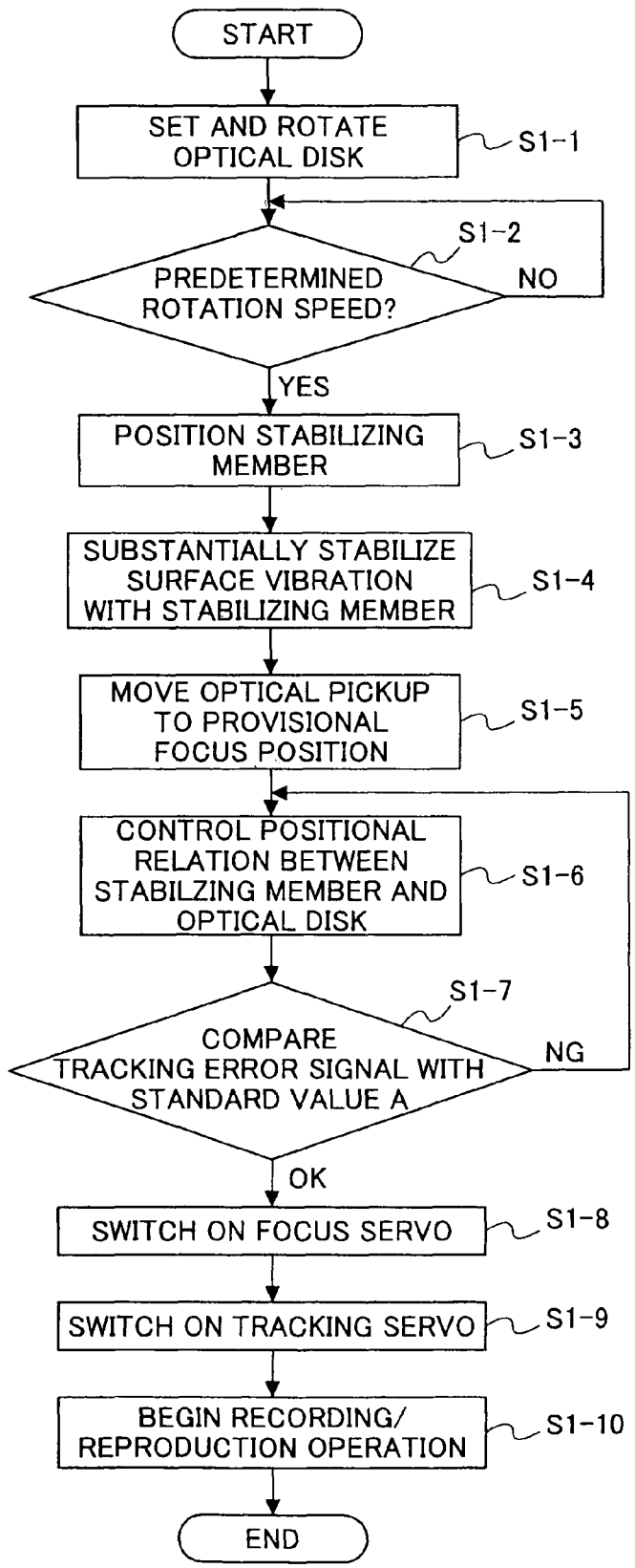
FIG. 9 is a flow chart regarding a control-adjustment operation for stabilizing surface vibration according to the first embodiment of the present invention.

Adjustment and control for stabilizing surface vibration for the first embodiment will be explained with reference to the flow chart shown in FIG. 9.

When a start signal is inputted into a CPU (central processing unit), the spindle motor 4 starts and rotates the optical disk 1 (step S1-1). When the optical disk 1 reaches a predetermined rotation speed (YES in step S1-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S1-3). Then, the stabilizing member 8 presses upon the optical disk 1 approximately 0.5 mm from a basic disk position plane (surface of the stabilizing member 8 supposing that the optical disk is in a flat state). Upon reaching a point where the surface vibration of the optical disk 1 is substantially stabilized (step S1-4), the stabilizing member/pickup space adjusting portion 45 performs adjustment, so that a provisional focus position of the optical pickup 6 would match to the surface center position O of the stabilizing member 8 (step S1-5).

Then, the CPU monitors and analyzes the property of the tracking error signal detected from a detector of the optical pickup 6 in a state where the focus servo is switched off, so as to derive a property analysis value, and thereby adjust and control the positional relation between the optical disk 1 and the stabilizing member 8 according to the property analysis value (step S1-6). That is, the stabilizing member 8 has a position and a tilt angle thereof being adjusted by moving the z-axis stabilizing member/pickup unit position control portion 40, the x-axis stabilizing member/pickup unit tilt angle control portion 42, and the y-axis stabilizing member/pickup unit tilt angle control portion 43, so that the maximum amplitude of the tracking error signal in a single rotation of a flexible sheet-like optical disk targeted for use would be 50% or more with respect to the standard value A, and so that the maximum amplitude of the envelope waveform of the tracking error signal in a single rotation of a flexible sheet-like optical disk targeted for use would be 25% or less with respect to the standard value A (step S1-7).

After performing such adjustment, the focus servo is switched on (step S1-8), and then the tracking servo is switched on (step S1-9), to thereby start recording/reproducing (step S1-10).

Performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

The optical disk apparatus of this embodiment is able to detect the stabilization state on the side of the optical disk 1 toward the pickup without requiring any particular measuring unit (e.g. electrostatic capacity type displacement sensor) for directly measuring the amount of surface vibration, thereby providing a simple and inexpensive optical disk apparatus.

In means to confirm the surface vibration adjusting effect of this embodiment, a surface vibration grading test using a laser displacement meter was conducted upon the pickup side of the optical disk 1 at a radial position of 40 mm. Results of the test revealed that surface vibration can be controlled to 3 micrometers or less, thereby proving effectiveness of the present invention. Furthermore, the aforementioned test was conducted for the first embodiment under the conditions where parameters (e.g. radial position of the grading target, rotation count of the disk, specifications of the disk) were altered within a practical range. Results of the test revealed that a constant stabilized surface vibration can be ensured on the pickup side of the optical disk 1, in which the surface vibration was no more than 3 micrometers.

Figure 10:
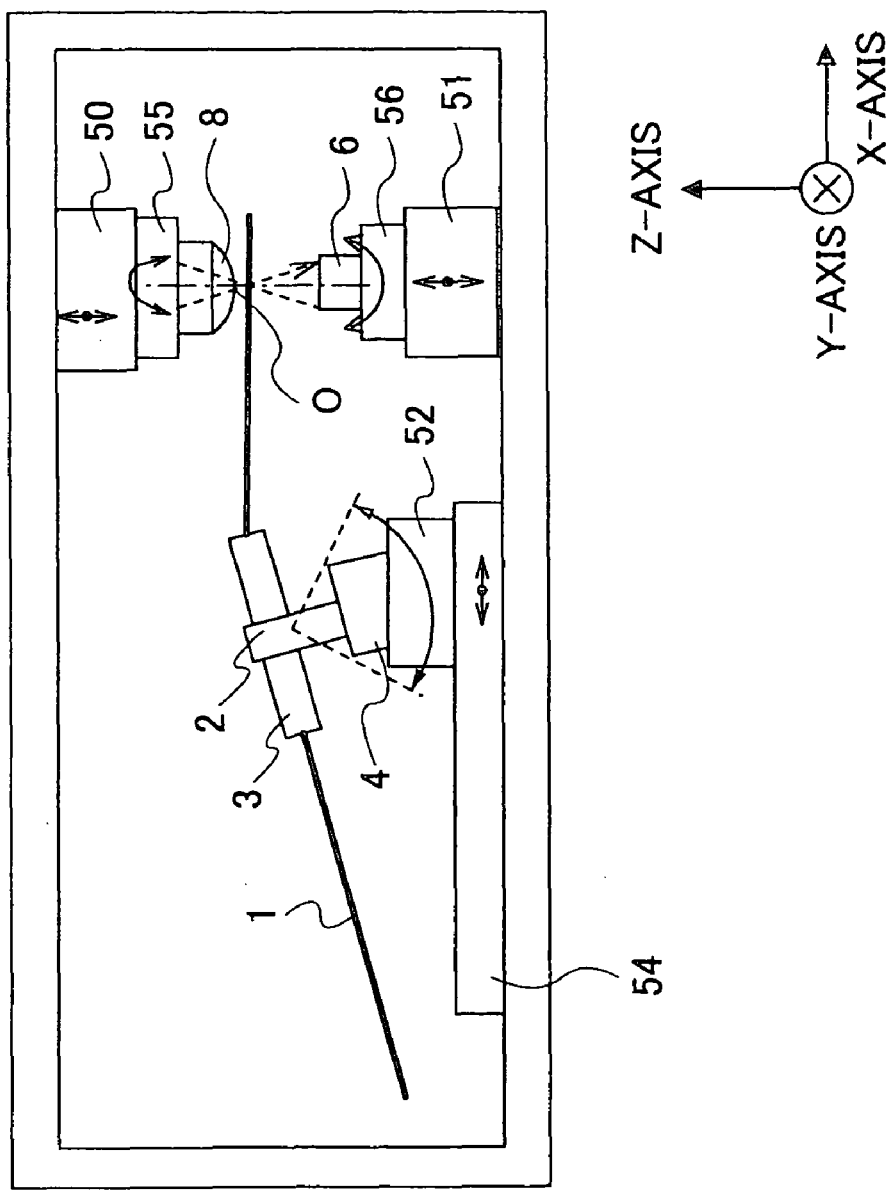
FIG. 10 is a schematic view showing an optical disk apparatus according to the second embodiment, the fifth embodiment, the eighth embodiment, and the eleventh embodiment of the present invention.

FIG. 10 is a schematic view showing a second embodiment of an optical disk apparatus according to the present invention, in which 50 denotes a z-axis stabilizing member position control portion, 51 denotes a z-axis pickup position control portion, 52 denotes an x-axis spindle tilt angle control portion, 54 denotes an x-axis spindle position control portion, 55 denotes a y-axis stabilizing member tilt angle control portion, and 56 denotes a y-axis pickup tilt angle control portion. The tilt angle for the y-axis stabilizing member tilt angle control portion 55 can be adjusted in a case where the surface center position O of the stabilizing member 8 serve as the rotary center. The tilt angle for the y-axis pickup tilt angle control portion 56 can be adjusted in a case where the focal point position of the optical pickup 6 serve as the rotary center. The y-axis stabilizing member tilt angle control portion 55 and the y-axis pickup tilt angle control portion 56 always move in association with each other so that the optical axis of the inbound-outbound rays of the optical pickup 6 would match with the center axis of the stabilizing member 8. The tilt angle of the spindle 2 is fixed in a manner tilted approximately 2 degrees toward the tilting direction as shown in FIG. 10.

Figure 11:
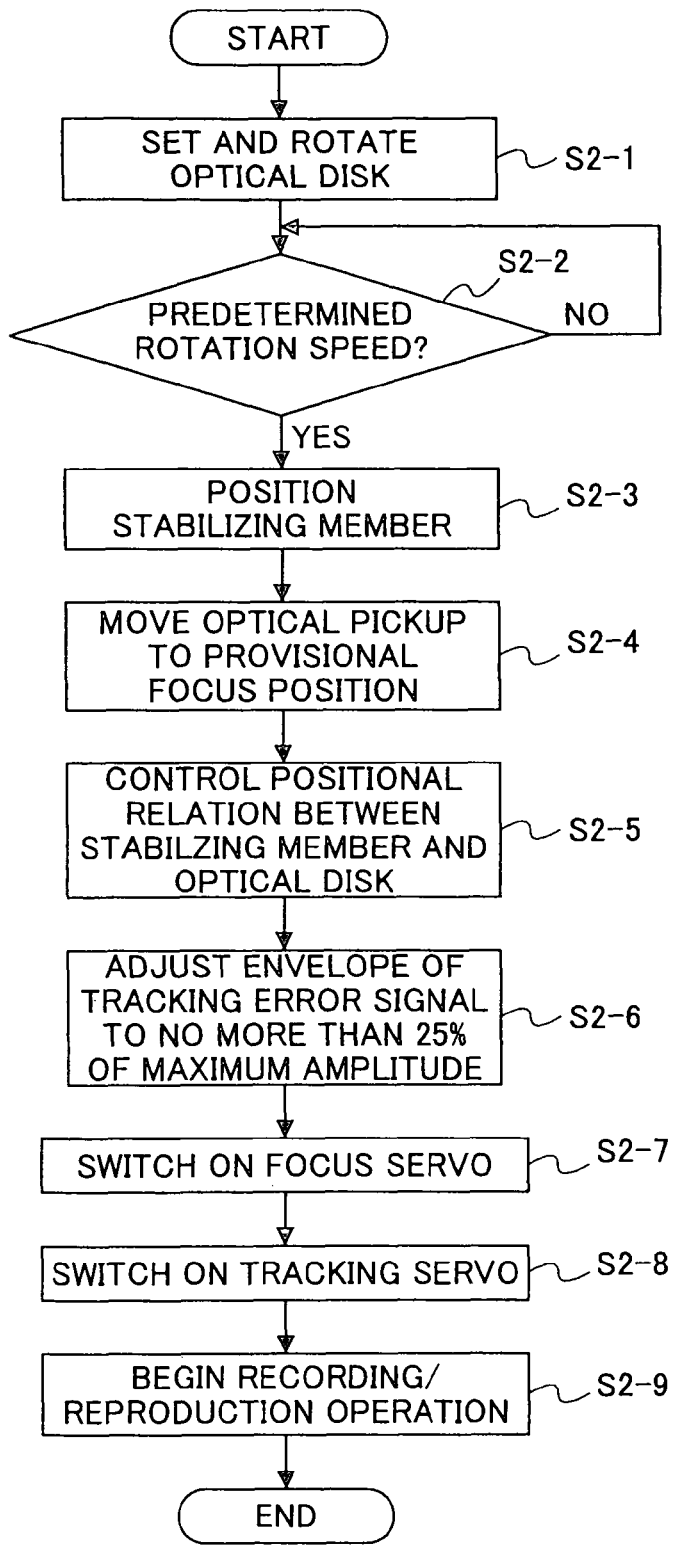
FIG. 11 is a flow chart regarding a control-adjustment operation for stabilizing surface vibration according to the second embodiment of the present invention.

Adjustment and control for stabilizing surface vibration for the second embodiment will be explained with reference to the flow chart shown in FIG. 11.

Namely, when a start signal is inputted into a CPU (central processing unit), the spindle motor 4 starts and rotates the optical disk 1 (step S2-1). When the optical disk 1 reaches a predetermined rotation speed (YES in step S2-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S2-3). Then, the stabilizing member 8 presses upon the optical disk 1 approximately 0.5 mm from a basic disk position plane (surface of the stabilizing member 8 supposing that the optical disk is in a flat state). Upon reaching a point where the surface vibration of the optical disk 1 is substantially stabilized (step S2-4), the z-axis pickup position control portion adjusts the position of the optical pickup 6 in the z-axis direction so that a provisional focus position of the optical pickup 6 would match with the surface center position O of the stabilizing member 8 (step S2-5).

Then, the CPU performs monitors and analyzes of the tracking error signal detected from a detector of the optical pickup 6 in a state where the focus servo is switched off, and the y-axis stabilizing member tilt angle control portion 55 adjusts the tilt angle of the stabilizing member 8 in the y-axis direction so that the maximum amplitude of the envelope wave form of the tracking error signal in a single rotation of a flexible sheet-like optical disk targeted for use would be 25% or less with respect to the standard value A (step S2-6).

After performing such adjustment, the focus servo is switched on (step S2-7), and then the tracking servo is switched on (step S2-8), to thereby start recording/reproducing (step S2-9).

Same as the first embodiment, performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

The optical disk apparatus of this embodiment is able to detect the stabilization state on the side of the optical disk 1 toward the pickup without requiring any particular measuring unit (e.g. electrostatic capacity type displacement sensor) for directly measuring the amount of surface vibration, thereby providing a simple and inexpensive optical disk apparatus.

In means to confirm the surface vibration adjusting effect of this embodiment, a surface vibration grading test using a laser displacement meter was conducted upon the pickup side of the optical disk 1a at a radial position of 40 mm and at a rotating speed of 3100 rpm. Results of the test revealed that surface vibration can be controlled to 3 micrometers or less, thereby proving effectiveness also for the second embodiment of the present invention. Furthermore, the aforementioned test was conducted for the second embodiment under the conditions where parameters (e.g. radial position of the grading target, rotation count of the disk, specifications of the disk) were altered within a practical range. Results of the test revealed that a constant stabilized surface vibration can be ensured on the pickup side of the optical disk 1, in which the surface vibration was no more than 5 micrometers.

In altering the parameters, the second embodiment presented a surface vibration of no more than 5 micrometers, which is greater to that of the first embodiment, due to the fact that the tilt angle of the optical disk 1 in the x-axis direction is fixed by the x-axis spindle tilt angle control portion. It has been observed that surface vibration could be reduced to 3 micrometers or less by adding an x-axis tilt angle as a factor for adjusting and controlling based on detected tracking error signal.

A third embodiment of the present invention will be described hereinafter. Since the optical disk apparatus of the third embodiment has the same structure as that of the first embodiment, the drawing of the optical disk of the third embodiment will be omitted. In the third embodiment, the three dimensional position of the stabilizing member 8 for stabilizing surface vibration is estimated beforehand based on detected tracking error signals relative to the position of the disk for recording/reproducing, the rotation count of the disk, and other specifications of the disk, thereby, an estimated value B, which serves as data for a preparatory positional movement of the stabilizing member 8, is stored into the memory of the CPU mounted on the optical disk apparatus.

Figure 12:
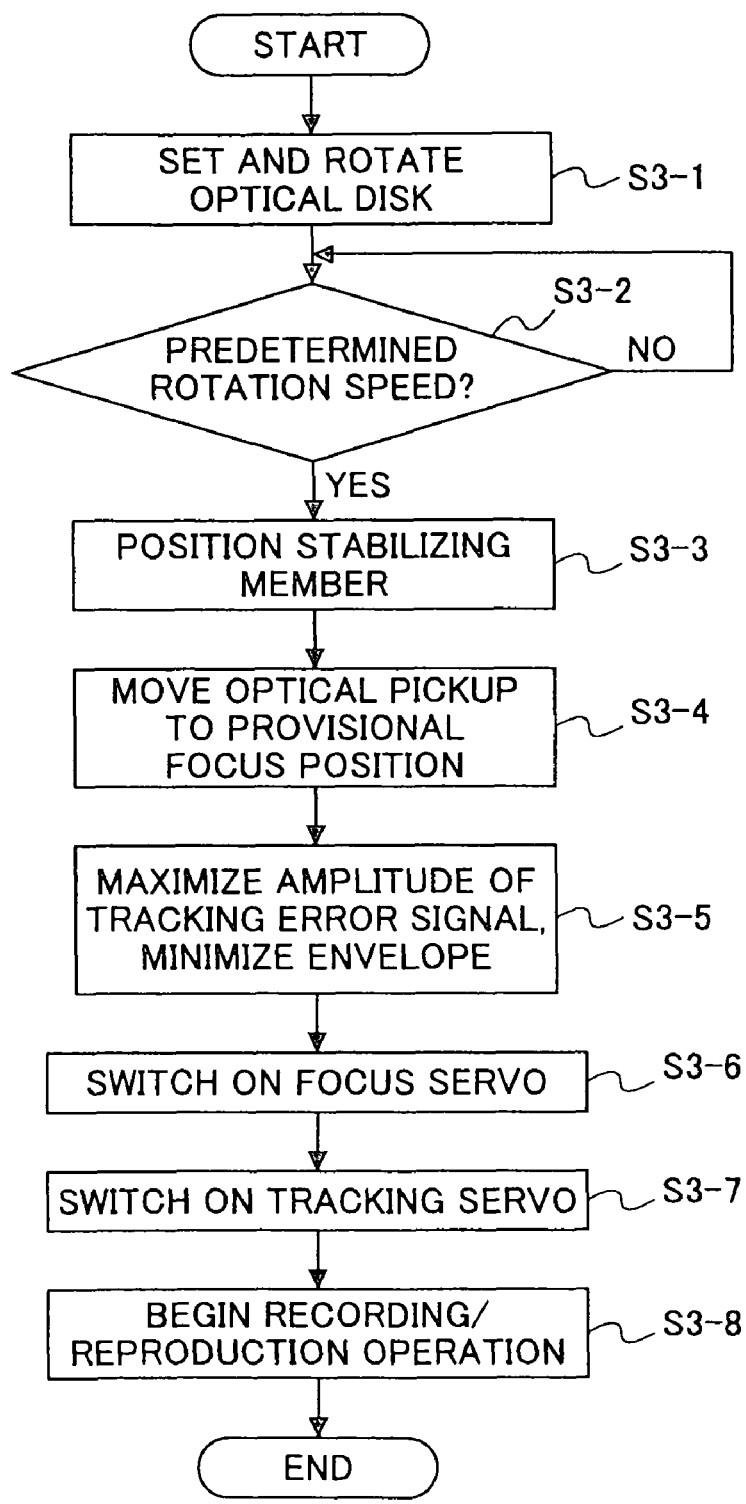
FIG. 12 is a flow chart regarding a control-adjustment operation for stabilizing surface vibration according to the third embodiment of the present invention.

Adjustment and control for stabilizing surface vibration for the third embodiment will be explained with reference to the flow chart shown in FIG. 12.

When a start signal is inputted into a CPU (central processing unit), the spindle motor 4 starts and rotates the optical disk 1 (step S3-1). When the optical disk 1 reaches a predetermined rotation speed (YES in step S3-2), the stabilizing member 8 is moved in a radial direction of the optical disk 1, the estimated value B is read out, and the stabilizing member 8 is set three dimensionally with respect to the optical disk 1 (step S3-3). The stabilizing member/pickup space adjusting portion 45 performs adjustment so that a provisional focus position of the optical pickup 6 would match with the surface center position O of the stabilizing member 8 (step S3-4).

Then, the CPU monitors and analyzes the tracking error signal detected from a detector of the optical pickup 6 in a state where the focus servo is switched off, to thereby allow the z-axis stabilizing member/pickup unit position control portion 40, the x-axis stabilizing member/pickup unit tilt angle control portion 42, and the y-axis stabilizing member/pickup unit tilt angle control portion to adjust the z-axis position and the tilt angle of the stabilizing member 8 for maximizing the amplitude of the tracking error signal and minimize the envelope waveform of the tracking error signal in a single rotation of a flexible sheet-like optical disk targeted for use (S3-5).

After performing such adjustment, the focus servo is switched on (step S3-6), and then the tracking servo is switched on (step S3-7), to thereby start recording/reproducing (step S3-8).

Same as the first embodiment, performing such adjustment and control enables surface vibration to be stabilized, and also enables initial setting of the stabilizing member 8 to be simplified.

Although the third embodiment roughly estimates the initial movement for setting the position of the stabilizing member 8 with respect to each optical disk 1, the estimate is not required to correspond to all parameters, but requires typical parameters such as the material of the disk, the thickness of the disk, or the type of composing layers of the disk, and requires to prepare only a number of positions for the preparatory movement of the stabilizing member 8.

It is to be noted that the same surface vibration stabilizing effect of the stabilizing member 8 has been observed by using the adjustment and control method in a case where an optical disk using polyethylene terephthalate is employed as the material for the sheet-like optical disk 1.

The adjustment control method for each embodiment may also be suitably performed in combination with each other.

Therefore, as explained above, the state of stabilizing surface vibration on the pickup side of the optical disk 1 can be precisely determined according to the tracking error signal, the focal point position of the optical pickup 6 and the stabilized position on the optical disk 1 can be matched, and a steady recording and/or reproducing can be performed at a portion where surface vibration is reduced. Furthermore, a simple and inexpensive optical disk apparatus can be provided since the apparatus performs adjustment and control without requiring any particular measuring unit for directly measuring the amount of surface vibration such as an electrostatic capacity type displacement sensor.

Furthermore, as a result of attempting to further improve the controlling method for stabilizing surface vibration of an optical disk, the inventors of the present invention had come to the following conclusion. Since the foregoing type of optical disk apparatus can considerably reduce the amount of surface vibration at a portion of the sheet-like optical disk on a side proximal to the optical pickup, surface vibration occurring on the side of the optical pickup can be restrained within a focus error detectable range (generally within approximately plus 20 micrometers to minus 20 micrometers), thereby allowing the surface vibration occurring on the side of the optical pickup to be precisely estimated based on detected focus error signal. This is a new phenomenon never observed in the conventional field of optical disks. Taking the phenomenon to advantage, surface vibration of the sheet-like optical disk occurring on the side toward the optical pickup can be regulated by monitoring and controlling of focus error signal.

Figure 13A:
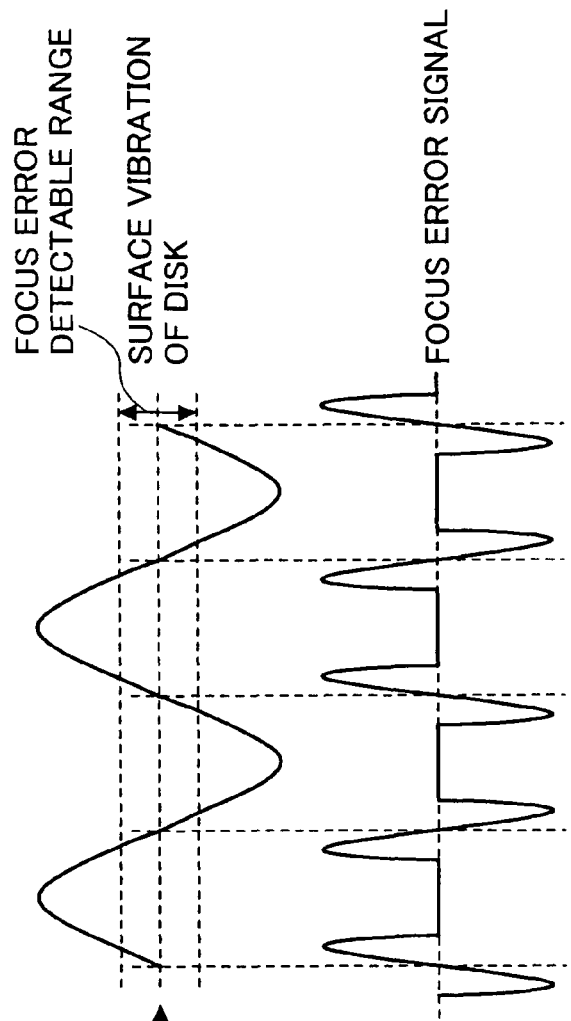
FIGS. 13A and 13B show a state of surface vibration of an optical disk and a focus error signal detected by a photodetector of a signal detecting system of an optical pickup according to the conventional optical disk apparatus and an optical disk apparatus of the present invention, respectively.
Figure 13B:
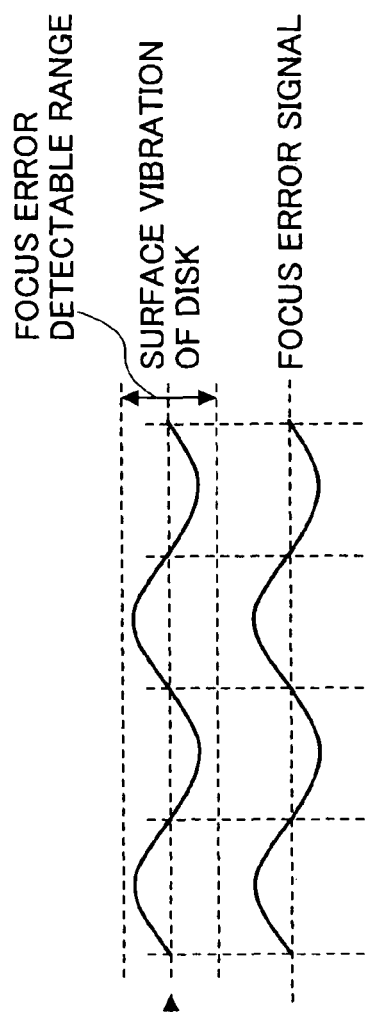
Figure 14:
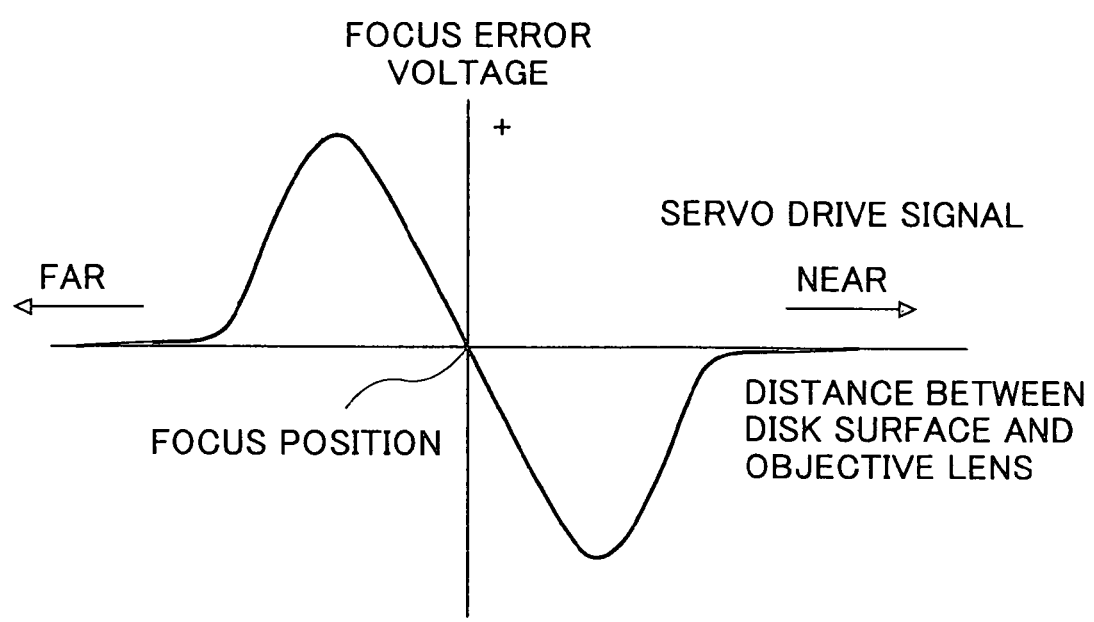
FIG. 14 an explanatory view showing an S-letter characteristic according to a photodetector of a signal detecting system of an optical pickup.

The relation between surface vibration of an optical disk and focus error signal will hereinafter be described in further detail. FIG. 13B shows a waveform of a focus error signal detected by a photodetector of a signal detecting system of the optical pickup 6 in a case where the optical disk shown in FIG. 1 to FIG. 5 has a focus servo and a tracking servo thereof in a switched off state. FIG. 13A shows a waveform of a typical focus error signal with respect to a conventional optical disk system and media thereof. A focus error signal system typically returns a detection waveform with an S-letter characteristic (as shown in FIG. 14) according to the distance between the disk surface and the objective lens, and outputs a zero signal when the photodetector is in a focus position, and outputs a plus signal or a minus signal when the photodetector deviates from the focus position. With the conventional optical disk, focus error signal could be detected only when the optical disk surface is proximal to the focus position of the photodetector due to the fact that surface vibration of the optical disk largely surpasses the focus error detectable range. Accordingly, as shown in FIG. 13A, the profile of the focus error signal in such case has a completely different shape and amplitude compared to the waveform of surface vibration. In the range surpassing the focus error detectable range, the changes in the amplitude of surface vibration does not reflect to the amplitude of focus error signal, and therefore, surface vibration of the optical disk cannot be estimated from the focus error signal. The optical disk apparatus of the present invention, however, is able to provide a close match between the profile of surface vibration and the profile of focus error signal owing to the fact that surface vibration is lowered considerably and that surface vibration is restrained within the focus error detectable range. Furthermore, since the amplitude of the focus error signal is able to trace the changes in the amplitude of surface vibration, a precise estimate of the amplitude of surface vibration can be obtained from the amplitude of the focus error signal.

As long as deviation from the focus position between the disk surface and the optical pickup can be precisely detected, various focus error signal detecting methods may be used for this embodiment such as an astigmatic method using a cylindrical lens and a four part photodetector, a method using a Foucault prism, etc. The aforementioned result of the focus error signal was obtained by detection with employment of an astigmatic method using a cylindrical lens.

FIG. 8 is a schematic view also for explaining a fourth embodiment of the optical disk apparatus to which the present invention is applied. It is to be noted that the same numerals are to be used for members corresponding to the above-mentioned members and that detailed explanations thereof will be omitted.

In FIG. 8, 40 denotes a z-axis stabilizing member/pickup unit position control portion, 41 denotes an x-axis stabilizing member/pickup unit position control portion, 42 denotes an x-axis stabilizing member/pickup unit tilt angle control portion, 43 denotes a y-axis stabilizing member/pickup unit tilt angle control portion, 44 denotes a stabilizing member/pickup unit casing body which holds the stabilizing member 8 and the optical pickup 6 therein, and 45 denotes a stabilizing member/pickup space adjusting portion which adjusts the space between the stabilizing member 8 and the optical pickup 6. The x-axis stabilizing member/pickup unit tilt angle control portion 42 and the y-axis stabilizing member/pickup unit tilt angle control portion 43 are mechanisms capable of adjusting the tilt angle in a case where the surface center position O of the stabilizing member 8 serve as the rotary center. The optical pickup 6 is fixed to the stabilizing member/pickup unit casing body 44 for allowing a laser light to be always perpendicular and incident upon the surface center position O of the stabilizing member 8. It is to be noted that the sheet-like optical disk 1 and the stabilizing member 8 have the same specifications as described above.

Figure 15:
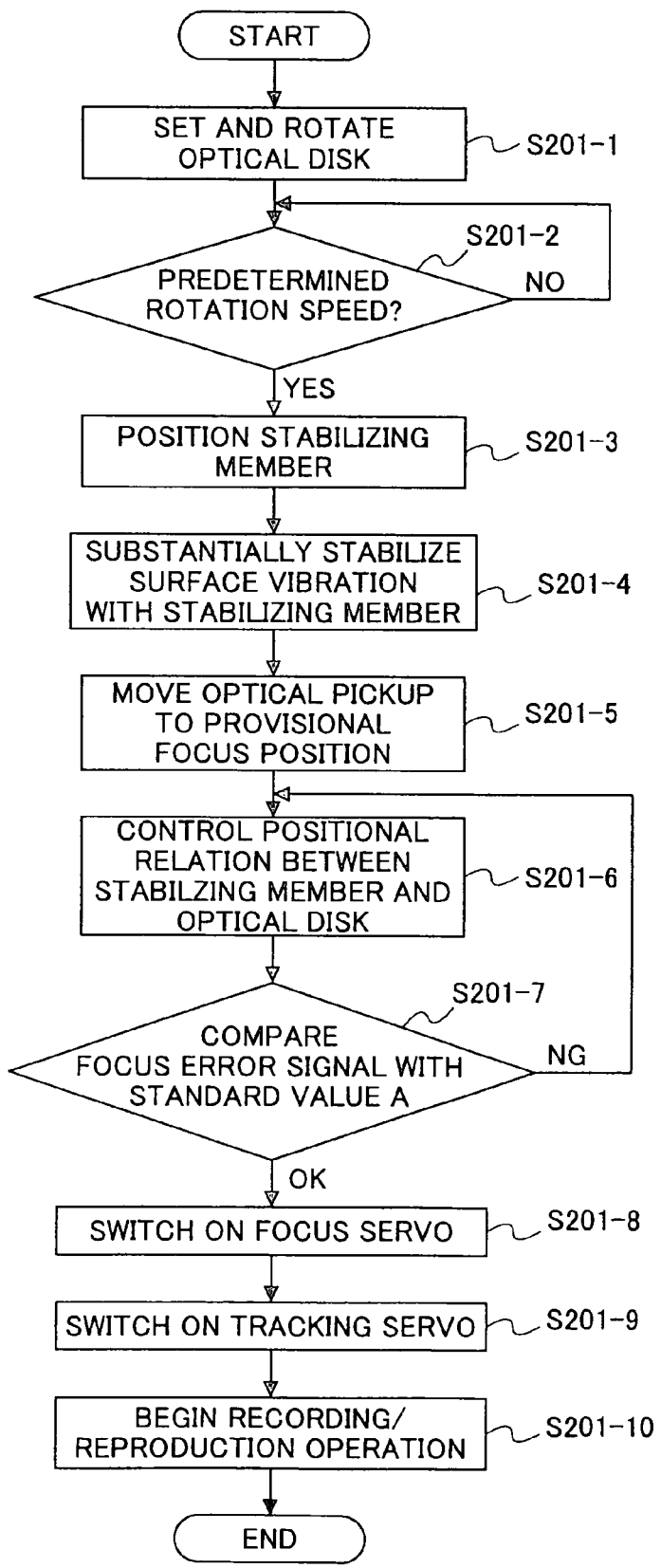
FIG. 15 is a flow chart regarding a control-adjustment operation for stabilizing surface vibration according to the fourth embodiment and the fifth of the present invention.

Adjustment and control with a CPU (Central Processing Unit, not shown) for stabilizing surface vibration for the fourth embodiment will be explained with reference to the flow chart shown in FIG. 15.

When a start signal is inputted into a CPU (central processing unit), the spindle motor 4 starts and rotates the optical disk 1 (step S201-1). When the optical disk 1 reaches a predetermined rotation speed (YES in step S201-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S201-3). Then, the stabilizing member 8 presses upon the optical disk 1 approximately 0.5 mm from a basic disk position plane (surface of the stabilizing member 8 supposing that the optical disk is in a flat state). Upon reaching a point where the surface vibration of the optical disk 1 becomes substantially stable (step S201-4), the stabilizing member/pickup space adjusting portion 45 performs adjustment, so that a provisional focus position of the optical pickup 6 would match to the surface center position O of the stabilizing member 8 (step S201-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction.

Then, the CPU monitors and analyzes the property of the focus error signal detected from a detector of the optical pickup 6 in a state where the focus servo is switched off, so as to derive a property analysis value, and thereby adjust and control the positional relation between the optical disk 1 and the stabilizing member 8 according to the property analysis value (step S201-6, S201-7). That is, the stabilizing member 8 has a z-axis position and a tilt angle thereof being adjusted by moving the z-axis stabilizing member/pickup unit position control portion 40, the x-axis stabilizing member/pickup unit tilt angle control portion 42, and the y-axis stabilizing member/pickup unit tilt angle control portion 43, so that a value (standard value) of no more than 5 micrometers could be obtained when the maximum amplitude of the focus error signal in a single rotation of a flexible sheet-like optical disk targeted for use is converted to amplitude of surface vibration of the optical disk.

After performing such adjustment, the focus servo is switched on (step S201-8), and then the tracking servo is switched on (step S201-9), to thereby start recording/reproducing (step S201-10).

It is to be noted that the standard value of 5 micrometers is a value set within an upper limit of 20 micrometers according to a surface vibration amplitude of 2.5 micrometers obtained at an optimum stabilization point under the conditions of rotating the optical disk at a range of 3100 rpm, and stabilizing surface vibration at a 40 mm radial position with the stabilizing member 8.

Performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

The optical disk apparatus of this embodiment is able to detect the stabilization state on the side of the optical disk 1 toward the optical pickup without requiring any particular measuring unit (e.g. electrostatic capacity type displacement sensor) for directly measuring the amount of surface vibration, thereby providing a simple and inexpensive optical disk apparatus.

In means to confirm the surface vibration adjusting effect of the fourth embodiment, a surface vibration grading test using a laser displacement meter was conducted upon the optical pickup side of the optical disk 1a at a radial position of 40 mm and at a rotating speed of 3100 rpm. Results of the test revealed that surface vibration can be controlled to 4 micrometers or less, thereby proving effectiveness of the present invention. Furthermore, the aforementioned test was conducted for the fourth embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 4 micrometers.

FIG. 10 is a schematic view also for showing a fifth embodiment of an optical disk apparatus according to the present invention, in which 50 denotes a z-axis stabilizing member position control portion, 51 denotes a z-axis pickup position control portion, 52 denotes an x-axis spindle tilt angle control portion, 54 denotes an x-axis spindle position control portion, 55 denotes a y-axis stabilizing member tilt angle control portion, and 56 denotes a y-axis pickup tilt angle control portion. The tilt angle for the y-axis stabilizing member tilt angle control portion 55 can be adjusted in a case where the surface center position O of the stabilizing member 8 serve as the rotary center. The tilt angle for the y-axis pickup tilt angle control portion 56 can be adjusted in a case where the focal point position of the optical pickup 6 serve as the rotary center. The y-axis stabilizing member tilt angle control portion 55 and the y-axis pickup tilt angle control portion 56 always move in association with each other so that the optical axis of the inbound-outbound rays of the optical pickup 6 would match with the center axis of the stabilizing member 8. The tilt angle of the spindle 2 is fixed in a manner tilted approximately 2 degrees toward the tilting direction as shown in FIG. 10.

Adjustment and control for stabilizing surface vibration for the fifth embodiment will also be explained with reference to the flow chart shown in FIG. 15.

When a start signal is inputted into a CPU (central processing unit), the spindle motor 4 starts and rotates the optical disk 1 (step S201-1). When the optical disk 1 reaches a predetermined rotation speed (YES in step S201-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S201-3). Then, the stabilizing member 8 presses upon the optical disk 1 approximately 0.5 mm from a basic disk position plane (surface of the stabilizing member 8 supposing that the optical disk is in a flat state) to a point where the surface vibration of the optical disk 1 becomes substantially stable (step S201-4). Then, the z-axis pickup position control portion 51 performs adjustment in the z-axis direction of the optical pickup 6, so that a provisional focus position of the optical pickup 6 would match to the surface center position O of the stabilizing member 8 (step S201-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction.

Then, the CPU monitors and analyzes the property of the focus error signal detected from a detector of the optical pickup 6 in a state where the focus servo is switched off, so as to derive a property analysis value, and thereby adjust and control the positional relation between the optical disk 1 and the stabilizing member 8 according to the property analysis value (step S201-6, S201-7). That is, the stabilizing member 8 has a tilt angle thereof being adjusted by moving the y-axis stabilizing member tilt angle control portion 55, so that a value (standard value) of no more than 5 micrometers could be obtained when the maximum amplitude of the focus error signal corresponding to a single rotation of a flexible sheet-like optical disk targeted for use is converted to an amplitude of surface vibration of the optical disk. After performing such adjustment, the focus servo is switched on (step S201-8), and then the tracking servo is switched on (step S201-9), to thereby start recording/reproducing (step S201-10).

It is to be noted that the standard value of 5 micrometers is a value set within an upper limit of 20 micrometers according to a surface vibration amplitude of 2.5 micrometers obtained at an optimum stabilization point under the conditions of rotating the optical disk at a range of 3100 rpm, and stabilizing surface vibration at a 40 mm radial position with the stabilizing member 8.

Same as the fourth embodiment, performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1. The optical disk apparatus of this embodiment is able to detect the stabilization state on the side of the optical disk 1 toward the optical pickup without requiring any particular measuring unit (e.g. electrostatic capacity type displacement sensor) for directly measuring the amount of surface vibration, thereby providing a simple and inexpensive optical disk apparatus.

In means to confirm the surface vibration adjusting effect of the fifth embodiment, a surface vibration grading test using a laser displacement meter was conducted upon the optical pickup side of the optical disk 1a at a radial position of 40 mm and at a rotating speed of 3100 rpm. Results of the test revealed that surface vibration can be controlled to 4 micrometers or less, thereby proving effectiveness of the fifth embodiment of the present invention. Furthermore, the aforementioned test was conducted for the fifth embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 5 micrometers.

A sixth embodiment of the present invention will be described hereinafter. Since the optical disk apparatus of the sixth embodiment has the same structure as that of the fourth embodiment, the drawing of the optical disk of the sixth embodiment will be omitted. In the sixth embodiment, the three dimensional position of the stabilizing member 8 for stabilizing surface vibration is estimated beforehand based on detected focus error signals relative to the radial position of the disk for recording/reproducing, the rotation count of the disk, and other specifications of the disk, thereby, an estimated value A, which serves as data for a preparatory positional movement of the stabilizing member 8, is stored into the memory of the CPU mounted on the optical disk apparatus.

Figure 16:
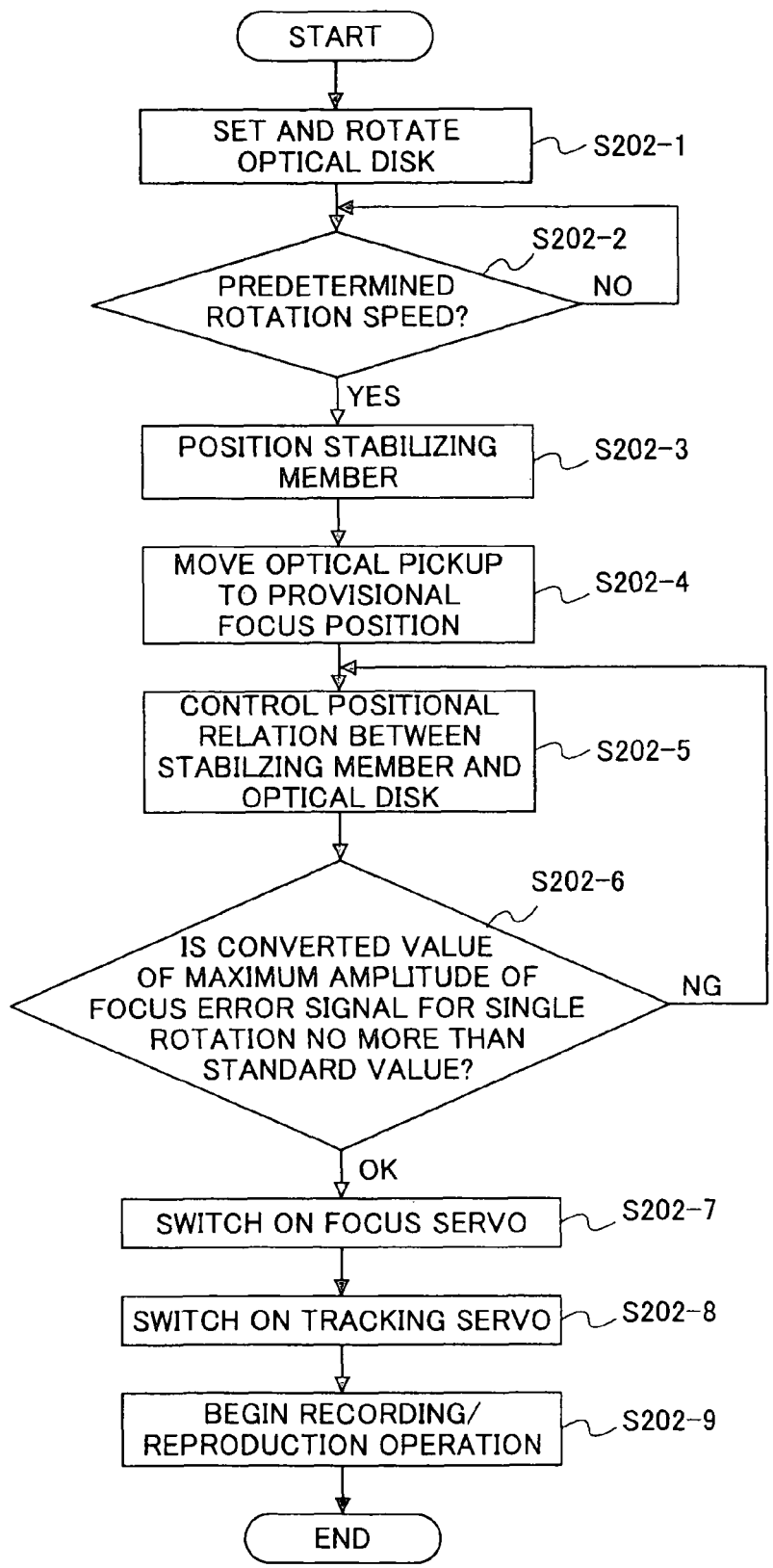
FIG. 16 is a flow chart regarding a control-adjustment operation for stabilizing surface vibration according to the sixth embodiment of the present invention.

Adjustment and control for stabilizing surface vibration for the sixth embodiment will be explained with reference to the flow chart shown in FIG. 16.

When a start signal is inputted into a CPU (central processing unit), the spindle motor 4 starts and rotates the optical disk 1 (step S202-1). When the optical disk 1 reaches a predetermined rotation speed (YES in step S202-2), the stabilizing member 8 is moved in a radial direction of the optical disk 1, the estimated value A is read out, and the stabilizing member 8 is three dimensionally positioned with respect to the optical disk 1 (step S202-3). The stabilizing member/pickup space adjusting portion 45 performs adjustment so that a provisional focus position of the optical pickup 6 would match with the surface center position O of the stabilizing member 8 (step S202-4).

Then, the CPU monitors and analyzes the property of the focus error signal detected from a detector of the optical pickup 6 in a state where the focus servo (tracing unit) is switched off, so as to derive a property analysis value, and to thereby slightly adjust and control the positional relation between the optical disk 1 and the stabilizing member 8 according to the property analysis value (step S202-5, S202-6). That is, the stabilizing member 8 has a z-axis position and a tilt angle thereof being adjusted by moving the z-axis stabilizing member/pickup unit position control portion 40, the x-axis stabilizing member/pickup unit tilt angle control portion 42, and the y-axis stabilizing member/pickup unit tilt angle control portion 43, so that a value (standard value) of no more than 5 micrometers could be obtained when the maximum amplitude of the focus error signal corresponding to a single rotation of a flexible sheet-like optical disk targeted for use is converted to an amplitude of surface vibration of the optical disk.

After performing such adjustment, the focus servo is switched on (step S202-7), and then the tracking servo is switched on (step S202-8), to thereby start recording/reproducing (step S202-9).

Same as the fourth embodiment, performing such adjustment and control enables surface vibration to be stabilized, and also enables initial setting of the stabilizing member 8 to be simplified.

Although the sixth embodiment roughly estimates the initial movement for setting the position of the stabilizing member 8 with respect to each optical disk 1, the estimate is not required to correspond to all parameters, but requires typical parameters such as the material of the disk, the thickness of the disk, or the type of composing layers of the disk, and requires to prepare only a number of positions for the preparatory movement of the stabilizing member 8.

It is to be noted that the same surface vibration stabilizing effect of the stabilizing member 8 has been observed by using the adjustment and control method in a case where an optical disk using polyethylene terephthalate is employed as the material, for the sheet-like optical disk 1.

Therefore, as explained above, the state of stabilizing surface vibration on the pickup side of the optical disk 1 can be precisely determined according to the focus error signal, the focal point position of the optical pickup 6 and the stabilized position on the optical disk 1 can be matched, and a steady recording and/or reproducing can be performed at a portion where surface vibration is reduced. Furthermore, a simple and inexpensive optical disk apparatus can be provided since the apparatus performs adjustment and control without requiring any particular measuring unit for directly measuring the amount of surface vibration such as an electrostatic capacity type displacement sensor.

Furthermore, as a result of attempting to further improve the controlling method for stabilizing surface vibration of an optical disk, the inventors of the present invention had come to the following conclusion. In a case where a focus servo mechanism traces the surface of the optical disk and controls the focus position of the optical pickup, there is a corresponding relation between the surface vibration of the optical disk surface and a servo driving signal during said tracing and said controlling operation. Therefore, by adjusting a three dimensional positional relation between the optical disk and the stabilizing member for allowing the servo driving signal to reach a standard value, the surface vibration of the optical disk can be reduced and adjusted.

Typically, with an optical disk apparatus having a focus error signal system which returns a detection waveform with an S-letter characteristic (as shown in FIG. 14), a drive amp controls the focus position of the optical pickup to enable the detected focus error signal to become a certain value (typically, a zero point), and enable the optical pickup to connect the focal points on the optical disk surface. The servo driving signal used for such control has information of surface vibration of the optical disk included therein, to thereby allow the amount of surface vibration of the optical disk to be estimated according to an analysis of the waveform, and allow the adjustment and control of the three dimensional positional relation between the optical disk and the stabilizing member.

Figure 17:
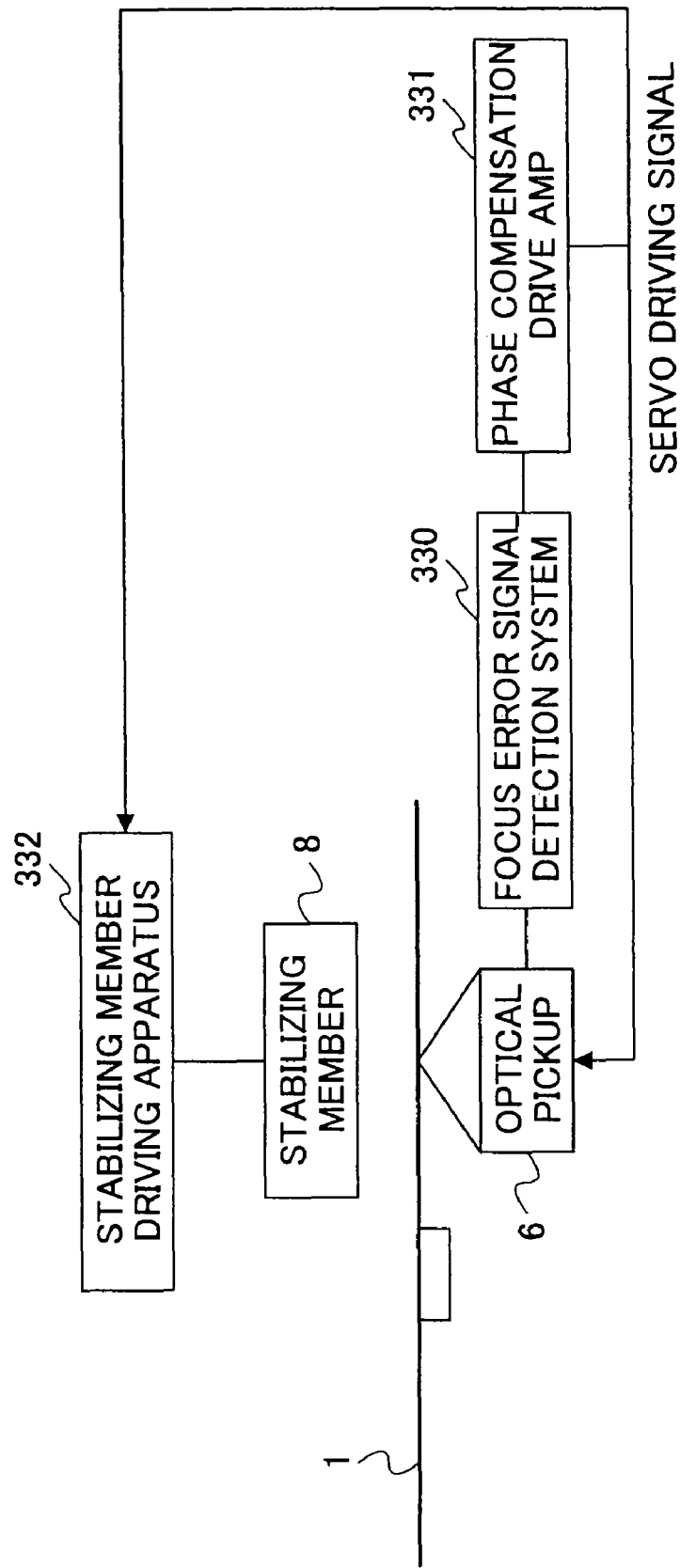
FIG. 17 is a block diagram showing an example of a control system for three dimensionally adjusting the positional relation between the optical disk and the stabilizing member according to the present invention.

FIG. 17 is a block diagram showing an example of a control system for adjusting the three dimensional positional relation between the optical disk and the stabilizing member. A phase compensating drive amp 331 performs phase compensation upon receiving a focus error signal detected from a focus error signal detection system 330, which comprises a detector or the like, of the optical pickup 6, and outputs a servo driving signal to the optical pickup 6 for enabling a suitable focus. Furthermore, a stabilizing member driving apparatus 332 monitors the servo driving signal and obtains a surface vibration signal of the optical disk 1, to thereby adjust the position of the stabilizing member 8 for reducing surface vibration occurring at a focus position of the optical pickup 6. Accordingly, recording and reproducing can be performed steadily at a position where there is little surface vibration.

In the example shown in FIG. 17, the three dimensional positional adjustment between the optical disk 1 and the stabilizing member 8 is performed on the side of the stabilizing member 8, that is, performed by the stabilizing member driving apparatus 332; nevertheless, it is to be noted that the present invention is not to be restricted to such configuration.

The present invention has no particular restriction regarding the type of detecting system or the type of control system for controlling the focus position of the optical pickup 6; therefore, the focus error signal detection system 30 may be, for example, an astigmatic method using a cylindrical lens and a four part photodetector, or a method using a Foucault prism, and the type of control system for controlling the focus position of the optical pickup 6 may be, for example, a method of mechanically moving the objective lens, or a method of using an electrostriction element or the like.

In this embodiment, detection and control of surface vibration can be perform in a state where the focus servo of the optical pickup 6 and the also the tracking servo are both switched on. Thereby, in a case where recording/reproducing is performed continuously while moving a radial position of the optical disk 1 at which recording/reproducing is performed, the focus position of the optical pickup 6 can constantly be tracked for adjusting surface vibration occurring thereat. This is a significant difference compared to the invention described in embodiments 1 to 6 in which detection and control of surface vibration is performed in a state where the focus servo (tracing unit) is switched off.

FIG. 8 is a schematic view also for explaining a seventh embodiment of the optical disk apparatus to which the present invention is applied. It is to be noted that the same numerals are to be used for members corresponding to the above-mentioned members and that detailed explanations thereof will be omitted.

In FIG. 8, 40 denotes a z-axis stabilizing member/pickup unit position control portion, 41 denotes an x-axis stabilizing member/pickup unit position control portion, 42 denotes an x-axis stabilizing member/pickup unit tilt angle control portion, 43 denotes a y-axis stabilizing member/pickup unit tilt angle control portion, 44 denotes a stabilizing member/pickup unit casing body which holds the stabilizing member 8 and the optical pickup 6 therein, and 45 denotes a stabilizing member/pickup space adjusting portion which adjusts the space between the stabilizing member 8 and the optical pickup 6. The x-axis stabilizing member/pickup unit tilt angle control portion 42 and the y-axis stabilizing member/pickup unit tilt angle control portion 43 are mechanisms capable of adjusting the tilt angle in a case where the surface center position O of the stabilizing member 8 serve as the rotary center. The optical pickup 6 is fixed to the stabilizing member/pickup unit casing body 44 for allowing a laser light to be always perpendicular and incident upon the surface center position O of the stabilizing member 8. It is to be noted that the sheet-like optical disk 1 and the stabilizing member 8 have the same specifications as described above.

Figure 18:
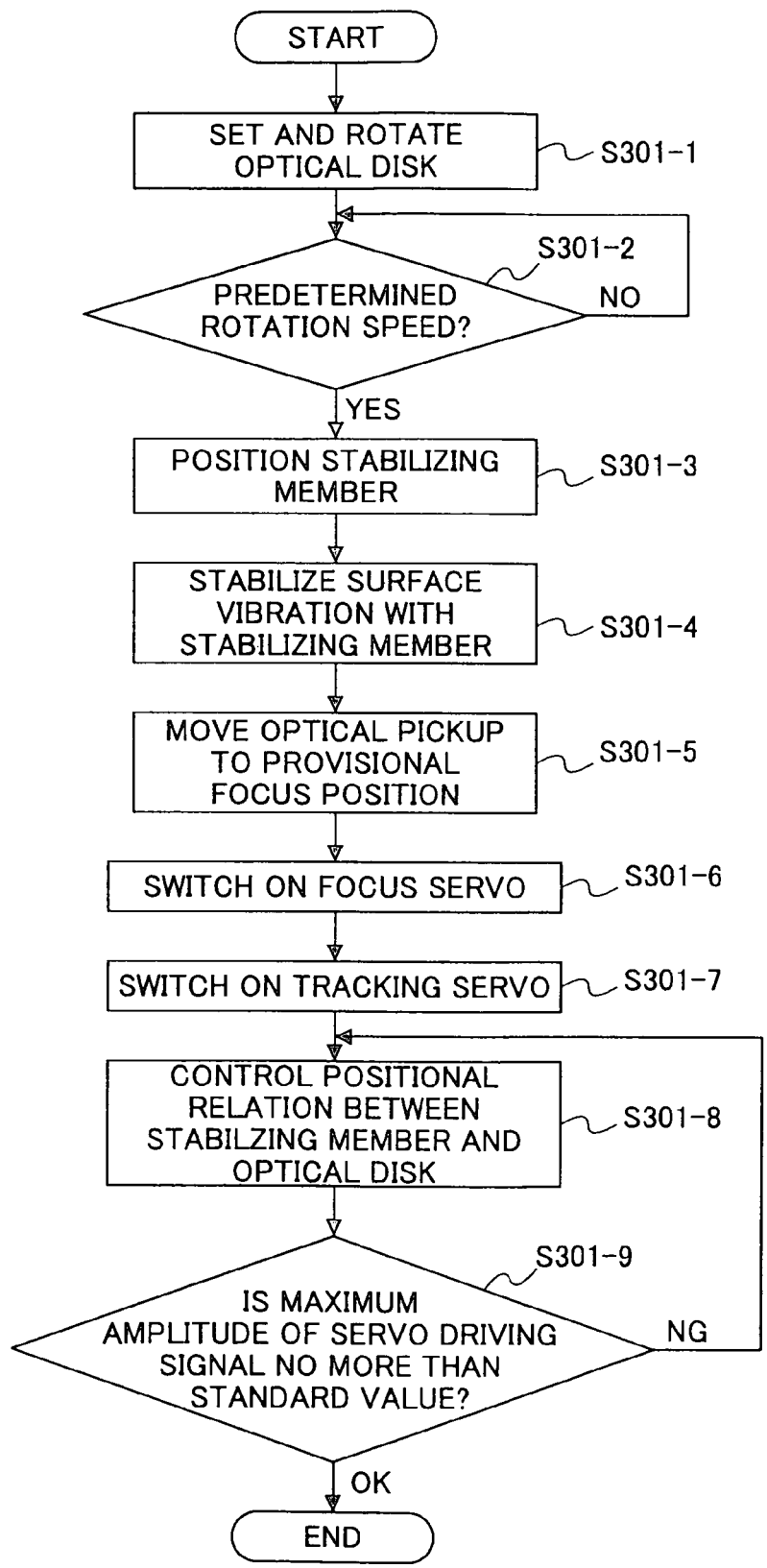
FIG. 18 is a flow chart regarding a control-adjustment operation for stabilizing surface vibration according to the seventh embodiment and the eighth embodiment of the present invention.

Adjustment and control with a CPU (Central Processing Unit, not shown) for stabilizing surface vibration for the seventh embodiment will be explained with reference to the flow chart shown in FIG. 18.

When a start signal is inputted into a CPU (central processing unit), the spindle motor 4 starts and rotates the optical disk 1 (step S301-1). When the optical disk 1 reaches a predetermined rotation speed (YES in step S301-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S301-3). Then, the stabilizing member 8 presses upon the optical disk 1 approximately 0.5 mm from a basic disk position plane (surface of the stabilizing member 8 supposing that the optical disk 1 is in a flat state). Upon reaching a point where the surface vibration of the optical disk 1 becomes substantially stable (step S301-4), the stabilizing member/pickup space adjusting portion 45 performs adjustment, so that a temporary focus position of the optical pickup 6 would match to the surface center position O of the stabilizing member 8 (step S301-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction. After performing such adjustment, the focus servo is switched on (step S301-6), and then the tracking servo is switched on (step S301-7).

Subsequently, the CPU monitors the servo driving signal of the focus servo and analyzes the property thereof, to thereby, adjust and control the positional relation between the optical disk 1 and the stabilizing member 8 according to the value obtained from the property analysis (S301-8, S301-9). That is, the stabilizing member 8 has a z-axis position and a tilt angle thereof being adjusted by moving the z-axis stabilizing member/pickup unit position control portion 40, the x-axis stabilizing member/pickup unit tilt angle control portion 42, and the y-axis stabilizing member/pickup unit tilt angle control portion 43, so that a maximum amplitude of the servo driving signal becomes no more than 0.5 V.

By constantly monitoring and adjusting the surface vibration, and repeating the steps such as (S301-8) and (S301-9) after performing the aforementioned adjustment, surface vibration at the focus position of the optical pickup 6 can be controlled to a constant stable state, even when there is a change in parameter (e.g. radial position of the optical disk 1 at which recording is performed, number of rotations of the optical disk) that influences the position at which surface vibration is stabilized. Thereby, for example, recording/reproducing can be performed continuously and constantly while moving a radial position of the optical disk 1 at which recording/reproducing is performed.

Even without constantly monitoring and adjusting the surface vibration of the optical disk 1, surface vibration of the optical disk 1 occurring at the focus position of the optical pickup 6 can be stabilized any time by performing the steps (S301-8) and (S301-9). The manner in which recording/reproducing is performed is variable, and is not to be restricted to the aforementioned embodiment.

It is to be noted that the standard value of the maximum amplitude of the servo driving signal being 0.5V is a prescribed value determined according to the relation between the servo driving signal and the amount of surface vibration of the optical disk 1, in which the value equals to a surface vibration amount of 5 micrometers. Although the servo driving signal is defined here by voltage, the servo driving signal may also be defined by electric current or electric power as well. The aforementioned standard value is only an example, and may be respectively determined in accordance with various kinds of servo driving systems. It is to be noted that the surface vibration standard value of 5 micrometers is a value set within an upper limit of 20 micrometers according to a surface vibration amplitude of 2.5 micrometers obtained at an optimum stabilization point under the conditions of rotating the optical disk at a range of 3100 rpm, and stabilizing surface vibration at a 40 mm radial position with the stabilizing member 8.

Performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

In means to confirm the surface vibration adjusting effect of the seventh embodiment, a surface vibration grading test using a laser displacement meter was conducted upon the optical pickup side of the optical disk 1a at a radial position of 40 mm and at a rotating speed of 3100 rpm. Results of the test revealed that surface vibration can be controlled to 4 micrometers or less, thereby proving effectiveness of the present invention. Furthermore, the aforementioned test was conducted for the seventh embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 4 micrometers.

FIG. 10 is a schematic view also for showing an eighth embodiment of an optical disk apparatus according to the present invention, in which 50 denotes a z-axis stabilizing member position control portion, 51 denotes a z-axis pickup position control portion, 52 denotes an x-axis spindle tilt angle control portion, 54 denotes an x-axis spindle position control portion, 55 denotes a y-axis stabilizing member tilt angle control portion, and 56 denotes a y-axis pickup tilt angle control portion. The tilt angle for the y-axis stabilizing member tilt angle control portion 55 can be adjusted in a case where the surface center position O of the stabilizing member 8 serve as the rotary center. The tilt angle for the y-axis pickup tilt angle control portion 56 can be adjusted in a case where the focal point position of the optical pickup 6 serve as the rotary center. The y-axis stabilizing member tilt angle control portion 55 and the y-axis pickup tilt angle control portion 56 always move in association with each other so that the optical axis of the inbound-outbound rays of the optical pickup 6 would match with the center axis of the stabilizing member 8. The tilt angle of the spindle 2 is fixed in a manner tilted approximately 2 degrees toward the tilting direction as shown in FIG. 10.

Adjustment and control for stabilizing surface vibration for the eighth embodiment will also be explained with reference to the flow chart shown in FIG. 18.

When a start signal is inputted into a CPU (central processing unit), the spindle motor 4 starts and rotates the optical disk 1 (step S301-1). When the optical disk 1 reaches a predetermined rotation speed (YES in step S301-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S301-3). Then, the stabilizing member 8 presses upon the optical disk 1 approximately 0.5 mm from a basic disk position plane (surface of the stabilizing member 8 supposing that the optical disk is in a flat state) to a point where the surface vibration of the optical disk 1 becomes substantially stable (step S301-4). Then, the z-axis pickup position control portion 51 performs adjustment in the z-axis direction of the optical pickup 6, so that a provisional focus position of the optical pickup 6 would match to the surface center position O of the stabilizing member 8 (step S301-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction. Subsequently, the focus servo is switched on (step S301-6), and then the tracking servo is switched on (step S301-7).

Subsequently, the CPU monitors the servo driving signal of the focus servo and analyzes the property thereof, to thereby, adjust and control the positional relation between the optical disk 1 and the stabilizing member 8 according to the value obtained from the property analysis (S301-8, S301-9). That is, the stabilizing member 8 has a tilt angle thereof being adjusted by moving the y-axis stabilizing member tilt angle control portion 55, so that the maximum amplitude of the servo driving signal becomes no more than 0.5 V.

By constantly monitoring and adjusting the surface vibration, and repeating the steps such as (S301-8) and (S301-9) after performing the aforementioned adjustment, surface vibration at the focus position of the optical pickup 6 can be controlled to a constant stable state, even when there is a change in parameter (e.g. radial position of the optical disk 1 at which recording/reproducing is performed, number of rotations of the optical disk) that influences the position at which surface vibration is stabilized. Thereby, for example, recording/reproducing can be performed continuously and constantly while moving a radial position of the optical disk 1 at which recording/reproducing is performed.

Even without constantly monitoring and adjusting the surface vibration of the optical disk 1, surface vibration of the optical disk 1 occurring at the focus position of the optical pickup 6 can be stabilized any time by performing the steps (S301-8) and (S301-9). The manner in which recording/reproducing is performed is variable, and is not to be restricted to the aforementioned embodiment.

It is to be noted that the standard value of the maximum amplitude of the servo driving signal being 0.5V is a prescribed value determined according to the relation between the servo driving signal and the amount of surface vibration of the optical disk 1, in which the value equals to a surface vibration amount of 5 micrometers. Although the servo driving signal is defined here by voltage, the servo driving signal may also be defined by electric current or electric power as well. The aforementioned standard value is only an example, and may be respectively determined in accordance with various kinds of servo driving systems.

It is to be noted that the surface vibration standard value of 5 micrometers is a value set within an upper limit of 20 micrometers according to a surface vibration amplitude of 2.5 micrometers obtained at an optimum stabilization point under the conditions of rotating the optical disk at a range of 3100 rpm, and stabilizing surface vibration at a 40 mm radial position with the stabilizing member 8.

Same as the seventh embodiment, performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

In means to confirm the surface vibration adjusting effect of the eighth embodiment, a surface vibration grading test using a laser displacement meter was conducted upon the optical pickup side of the optical disk 1$a$ at a radial position of 40 mm and at a rotating speed of 3100 rpm. Results of the test revealed that surface vibration can be controlled to 4 micrometers or less, thereby proving effectiveness of the present invention. Furthermore, the aforementioned test was conducted for the eighth embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 5 micrometers.

A ninth embodiment of the present invention will be described hereinafter. Since the optical disk apparatus of the ninth embodiment has the same structure as that of the seventh embodiment, the drawing of the optical disk of the ninth embodiment will be omitted. In the ninth embodiment, the three dimensional position of the stabilizing member 8 for stabilizing surface vibration is estimated beforehand based on detected focus error signals relative to the radial position of the disk for recording/reproducing, the rotation count of the disk, and other specifications of the disk, thereby, an estimated value A, which serves as data for a preparatory positional movement of the stabilizing member 8, is stored into the memory of the CPU mounted on the optical disk apparatus.

Figure 19:
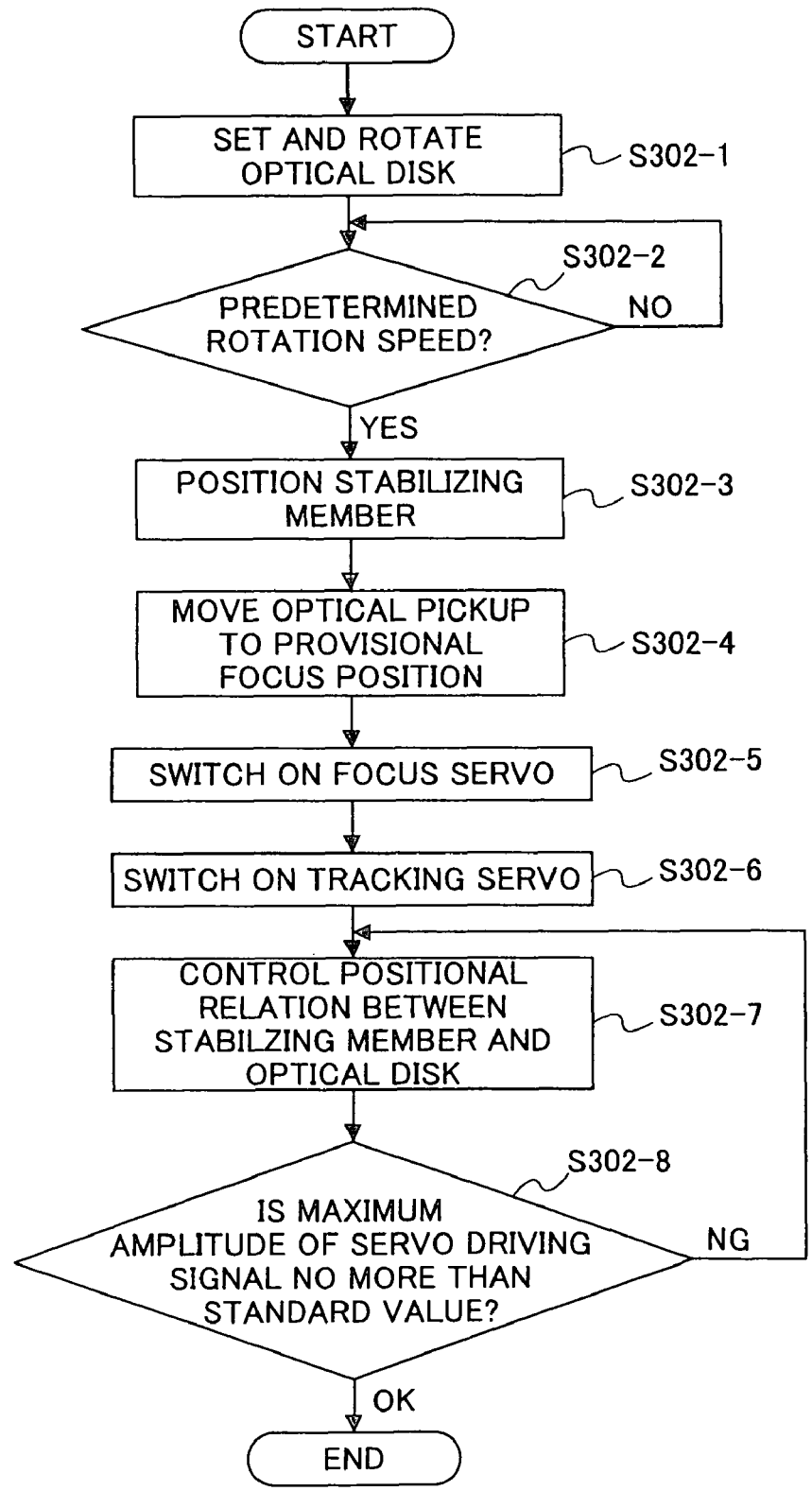
FIG. 19 is a flow chart regarding a control-adjustment operation for stabilizing surface vibration according to the ninth embodiment of the present invention.

Adjustment and control for stabilizing surface vibration with a CPU for the ninth embodiment will be explained with reference to the flow chart shown in FIG. 19.

When a start signal is inputted into a CPU (central processing unit), the spindle motor 4 starts and rotates the optical disk 1 (step S302-1). When the optical disk 1 reaches a predetermined rotation speed (YES in step S302-2), the stabilizing member 8 is moved in a radial direction of the optical disk 1, the estimated value A is read out, and the stabilizing member 8 is three dimensionally positioned with respect to the optical disk 1 (step S302-3). The stabilizing member/pickup space adjusting portion 45 performs adjustment so that a provisional focus position of the optical pickup 6 would match with the surface center position O of the stabilizing member 8 (step S302-4). Subsequently, the focus servo is switched on (step S302-5), and then the tracking servo is switched on (step S302-6).

Subsequently, the CPU monitors the servo driving signal of the focus servo and analyzes the property thereof, to thereby, adjust and control the positional relation between the optical disk 1 and the stabilizing member 8 according to the value obtained from the property analysis (S301-8, S301-9). That is, the stabilizing member 8 has a z-axis position and a tilt angle thereof being adjusted by moving and slightly adjusting the z-axis stabilizing member/pickup unit position control portion 40, the x-axis stabilizing member/pickup unit tilt angle control portion 42, and the y-axis stabilizing member/ pickup unit tilt angle control portion 43, so that a maximum amplitude of the servo driving signal becomes no more than 0.5 V.

Same as the seventh embodiment, performing such adjustment and control enables surface vibration to be stabilized, and also enables initial setting of the stabilizing member 8 to be simplified.

Although the ninth embodiment roughly estimates the initial movement for setting the position of the stabilizing member 8 with respect to each optical disk 1, the estimate is not required to correspond to all parameters, but requires typical parameters such as the material of the disk, the thickness of the disk, or the type of composing layers of the disk, and requires to prepare only a number of positions for the preparatory movement of the stabilizing member 8.

It is to be noted that the same surface vibration stabilizing effect of the stabilizing member 8 has been observed by using the adjustment and control method in a case where an optical disk using polyethylene terephthalate is employed as the material for the sheet-like optical disk 1.

Therefore, as explained above, the state of stabilizing surface vibration on the pickup side of the optical disk 1 can be precisely determined according to the servo driving signal, the focal point position of the optical pickup 6 and the stabilized position on the optical disk 1 can be matched by adjusting the positional relation between the optical disk and the stabilizing member, and the value of surface vibration occurring at a position of the optical disk at which recording/ reproducing is performed can be reduced considerably, to thereby enable easy correspondence to a high NA optical pickup having narrow defocus margin and narrow work distance, and enable steady recording and/or reproduction.

Furthermore, as a result of attempting to further improve the controlling method for stabilizing surface vibration of an optical disk, the inventors of the present invention had come to the following conclusion. Even after a focus servo of the optical pickup is switched on, surface vibration information included in a residual defocus element, that is, residual focus error signal can be analyzed so that a three dimensional positional relation between the optical disk and the stabilizing member can be adjusted according to a value obtained from the analysis. Thereby, the surface vibration of the optical disk can be reduced and adjusted.

Typically, with an optical disk apparatus having a focus error signal system which returns a detection waveform with an S-letter characteristic (as shown in FIG. 14), a drive amp controls (serves as focus servo) the focus position of the optical pickup to enable the detected focus error signal to become a certain value (typically, a zero point), and enable the optical pickup to connect the focal points on the optical disk surface. An element obtained from the focus servo not being able to fully trace the surface vibration of the disk, that is, an actual surface vibration element observed from the optical pickup when the focus servo is switched on, can be detected as residual focus error. A residual focus error signal therefore has direct information on surface vibration included therein. By using a value obtained from analyzing the residual focus error signal, the adjustment and control of the three dimensional positional relation between the optical disk and the stabilizing member can be performed.

Figure 20:
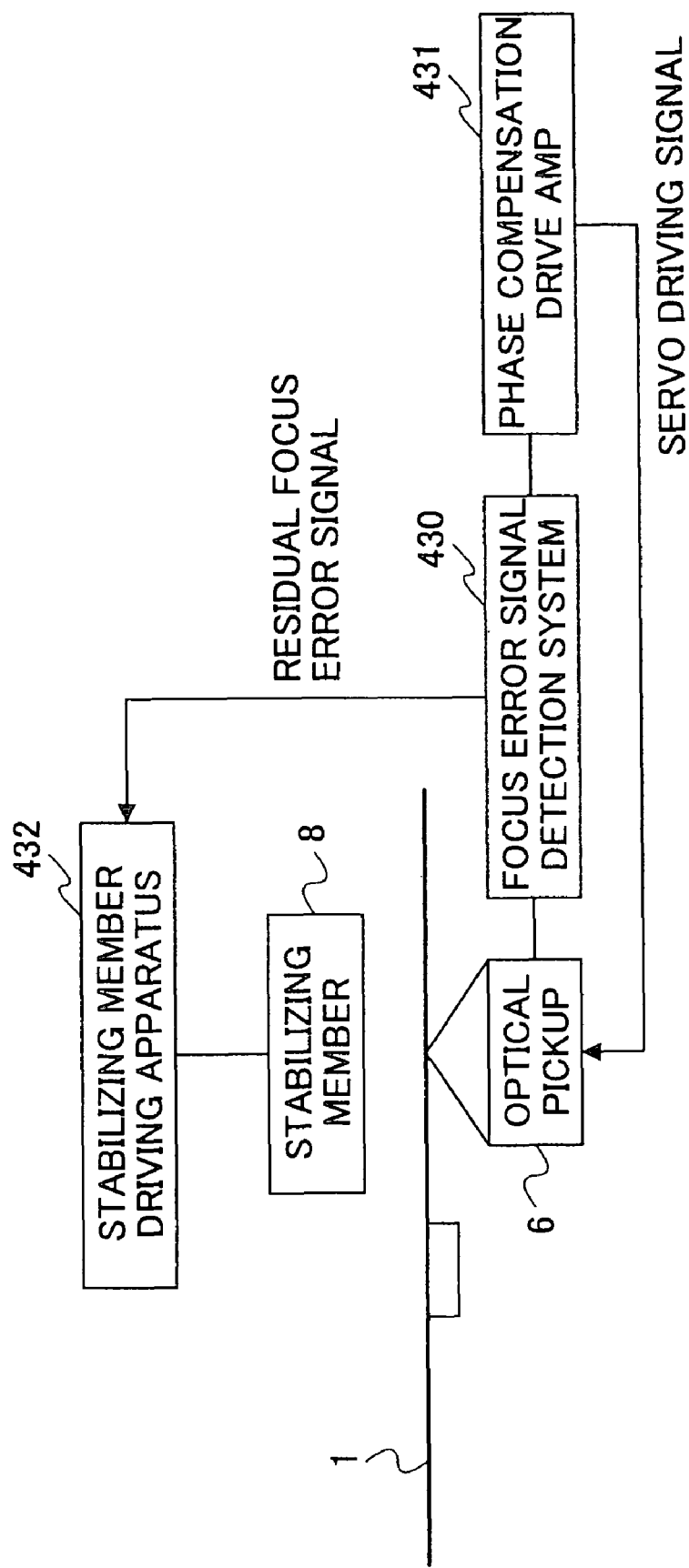
FIG. 20 is a block diagram showing another example of a control system for three dimensionally adjusting the positional relation between the optical disk and the stabilizing member according to the present invention.

FIG. 20 is a block diagram showing an example of a control system for adjusting the three dimensional positional relation between the optical disk and the stabilizing member. A phase compensating drive amp 431 performs phase compensation upon receiving a focus error signal detected from a focus error signal detection system 430, which comprises a detector or the like, of the optical pickup 6, and outputs a servo driving signal to the optical pickup 6 for enabling a suitable focus. Furthermore, a stabilizing member driving apparatus 432 monitors the residual focus error signal of the focus error signal detection system 430 and obtains a surface vibration signal of the optical disk 1, to thereby adjust the position of the stabilizing member 8 for reducing surface vibration occurring at a focus position of the optical pickup 6. Accordingly, recording and reproducing can be performed steadily at a position where there is little surface vibration.

In the example shown in FIG. 20, the three dimensional positional adjustment between the optical disk 1 and the stabilizing member 8 is performed on the side of the stabilizing member 8, that is, performed by the stabilizing member driving apparatus 432; nevertheless, it is to be noted that the present invention is not to be restricted to such configuration.

The present invention has no particular restriction regarding the type of detecting system or the type of control system for controlling the focus position of the optical pickup 6; therefore, the focus error signal detection system 430 may be, for example, an astigmatic method using a cylindrical lens and a four part photodetector, or a method using a Foucault prism, and the type of control system for controlling the focus position of the optical pickup 6 may be, for example, a method of mechanically moving the objective lens, or a method of using an electrostriction element or the like.

In this embodiment, detection and control of surface vibration can be perform in a state where the focus servo of the optical pickup 6 and the also the tracking servo are both switched on. Thereby, in a case where recording/reproducing is performed continuously while moving a radial position of the optical disk 1 at which recording/reproducing is performed, the focus position of the optical pickup 6 can constantly be tracked for adjusting surface vibration occurring thereat. This is a significant difference compared to the invention described embodiments 1 to 6 in which detection and control of surface vibration is performed in a state where the focus servo (tracing unit) is switched off.

FIG. 8 is a schematic view for explaining a tenth embodiment of the optical disk apparatus to which the present invention is applied. It is to be noted that the same numerals are to be used for members corresponding to the above-mentioned members and that detailed explanations thereof will be omitted.

In FIG. 8, 40 denotes a z-axis stabilizing member/pickup unit position control portion, 41 denotes an x-axis stabilizing member/pickup unit position control portion, 42 denotes an x-axis stabilizing member/pickup unit tilt angle control portion, 43 denotes a y-axis stabilizing member/pickup unit tilt angle control portion, 44 denotes a stabilizing member/pickup unit casing body which holds the stabilizing member 8 and the optical pickup 6 therein, and 45 denotes a stabilizing member/pickup space adjusting portion which adjusts the space between the stabilizing member 8 and the optical pickup 6. The x-axis stabilizing member/pickup unit tilt angle control portion 42 and the y-axis stabilizing member/pickup unit tilt angle control portion 43 are mechanisms capable of adjusting the tilt angle in a case where the surface center position O of the stabilizing member 8 serve as the rotary center. The optical pickup 6 is fixed to the stabilizing member/pickup unit casing body 44 for allowing a laser light to be always perpendicular and incident upon the surface center position o of the stabilizing member 8. It is to be noted that the sheet-like optical disk 1 and the stabilizing member 8 have the same specifications as described above.

Figure 21:
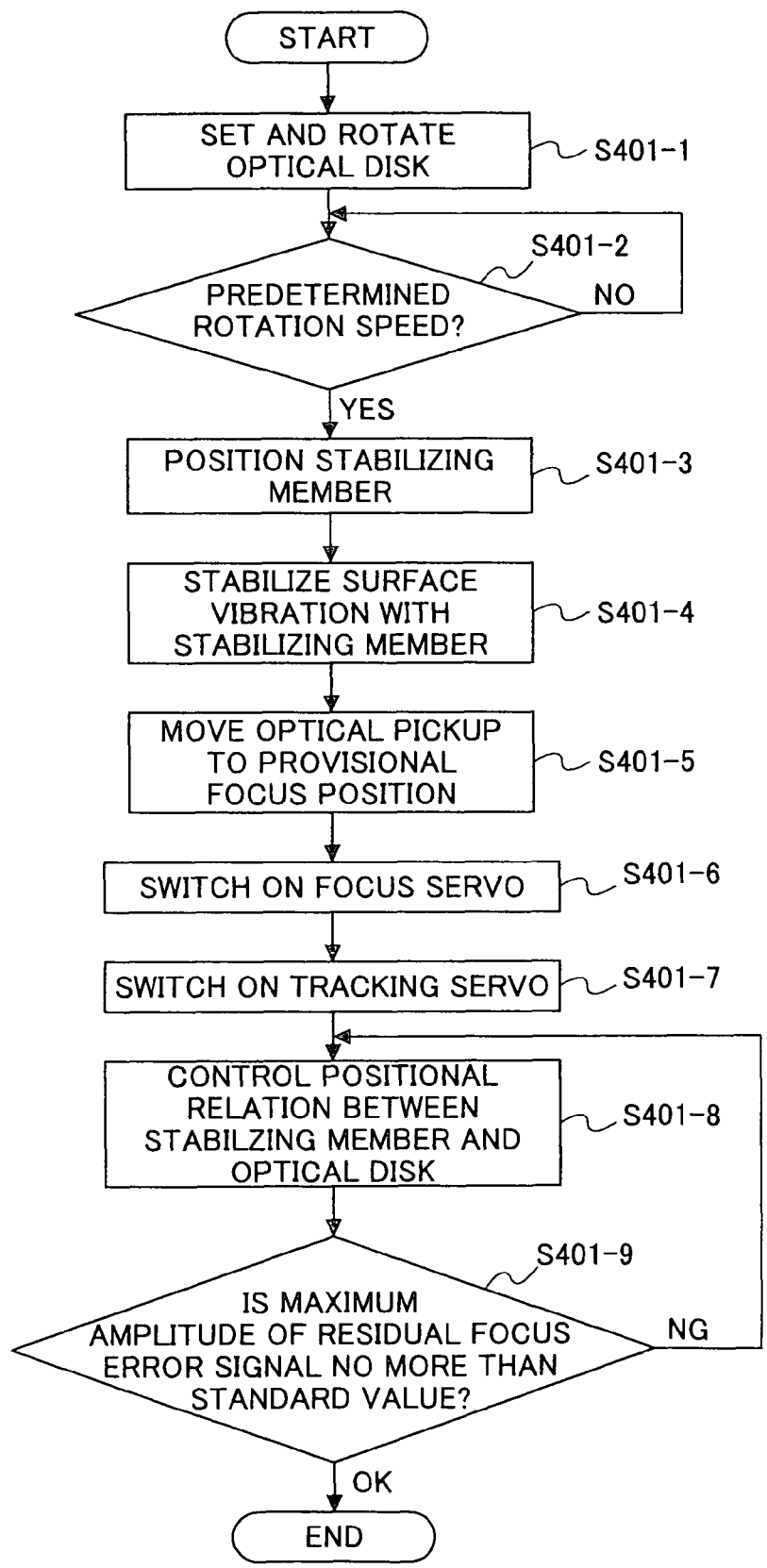
FIG. 21 is a flow chart regarding a control-adjustment operation for stabilizing surface vibration according to the tenth embodiment and the eleventh embodiment of the present invention.

Adjustment and control for stabilizing surface vibration with the tenth embodiment will be explained with reference to the flow chart shown in FIG. 21.

When a start signal is inputted into a CPU (central processing unit), the spindle motor 4 starts and rotates the optical disk 1 (step S401-1). When the optical disk 1 reaches a predetermined rotation speed (YES in step S401-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S401-3). Then, the stabilizing member 8 presses upon the optical disk 1 approximately 0.5 mm from a basic disk position plane (surface of the stabilizing member 8 supposing that the optical disk 1 is in a flat state). Upon reaching a point where the surface vibration of the optical disk 1 becomes substantially stable (step S401-4), the stabilizing member/pickup space adjusting portion 45 performs adjustment, so that a temporary focus position of the optical pickup 6 would match to the surface center position O of the stabilizing member 8 (step S401-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction. After performing such adjustment, the focus servo is switched on (step S401-6), and then the tracking servo is switched on (step S401-7).

Subsequently, the CPU monitors the residual focus error signal of the focus servo and analyzes the property thereof, to thereby, adjust and control the positional relation between the optical disk 1 and the stabilizing member 8 according to the value obtained from the property analysis (S401-8, S401-9). That is, the stabilizing member 8 has a z-axis position and a tilt angle thereof being adjusted by moving the z-axis stabilizing member/pickup unit position control portion 40, the x-axis stabilizing member/pickup unit tilt angle control portion 42, and the y-axis stabilizing member/pickup unit tilt angle control portion 43, so that a maximum amplitude of the residual focus error signal becomes no more than 0.5 V.

By constantly monitoring and adjusting the surface vibration, and repeating the steps such as (S401-8) and (S401-9) after performing the aforementioned adjustment, surface vibration at the focus position of the optical pickup 6 can be controlled to a constant stable state, even when there is a change in parameter (e.g. radial position of the optical disk 1 at which recording is performed, number of rotations of the optical disk) that influences the position at which surface vibration is stabilized. Thereby, for example, recording/reproducing can be performed continuously and constantly while moving a radial position of the optical disk 1 at which recording/reproducing is performed.

Even without constantly monitoring and adjusting the surface vibration of the disk, surface vibration of the disk occurring at the focus position of the optical pickup 6 can be stabilized any time by performing the steps (S401-8) and (S401-9). The manner in which recording/reproducing is performed is variable, and is not to be restricted to the aforementioned embodiment.

It is to be noted that the standard value of the maximum amplitude of the residual focus error signal being 0.5V is a prescribed value determined according to the relation between the residual focus error signal and the amount of surface vibration of the disk, in which the value equals to a surface vibration amount of 0.2 micrometers. The aforementioned standard value is only an example of this embodiment, and may be respectively determined in accordance with various kinds of optical pickups. It is to be noted that the surface vibration standard value of 0.2 micrometers is a value set according to an amount of defocus required for an optical pickup of 0.8 NA.

Performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

In means to confirm the surface vibration adjusting effect of the tenth embodiment, a surface vibration grading test using a laser displacement meter was conducted upon the optical pickup side of the optical disk 1a at a radial position of 40 mm and at a rotating speed of 3100 rpm. Results of the test revealed that surface vibration can be controlled to 4 micrometers or less, thereby proving effectiveness of the present invention. Furthermore, the aforementioned test was conducted for the tenth embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 4 micrometers.

FIG. 10 is a schematic view also showing a eleventh embodiment of an optical disk apparatus according to the present invention, in which 50 denotes a z-axis stabilizing member position control portion, 51 denotes a z-axis pickup position control portion, 52 denotes an x-axis spindle tilt angle control portion, 54 denotes an x-axis spindle position control portion, 55 denotes a y-axis stabilizing member tilt angle control portion, and 56 denotes a y-axis pickup tilt angle control portion. The tilt angle for the y-axis stabilizing member tilt angle control portion 55 can be adjusted in a case where the surface center position O of the stabilizing member 8 serve as the rotary center. The tilt angle for the y-axis pickup tilt angle control portion 56 can be adjusted in a case where the focal point position of the optical pickup 6 serve as the rotary center. The y-axis stabilizing member tilt angle control portion 55 and the y-axis pickup tilt angle control portion 56 always move in association with each other so that the optical axis of the inbound-outbound rays of the optical pickup 6 would match with the center axis of the stabilizing member 8. The tilt angle of the spindle 2 is fixed in a manner tilted approximately 2 degrees toward the tilting direction as shown in FIG. 10.

Adjustment and control for stabilizing surface vibration for the eleventh embodiment will also be explained with reference to the flow chart shown in FIG. 21.

When a start signal is inputted into a CPU (central processing unit), the spindle motor 4 starts and rotates the optical disk 1 (step S401-1). When the optical disk 1 reaches a predetermined rotation speed (YES in step S401-2), the stabilizing member 8 is moved in a radial direction of the optical disk 1, the surface center position O of the stabilizing member 8 is adjusted to a prescribed position in a radial direction of the optical disk 1, and the stabilizing member 8 is moved proximal to the optical disk 1 (step S401-3). Then, the stabilizing member 8 presses upon the optical disk 1 approximately 0.5 mm from a basic disk position plane (surface of the stabilizing member 8 supposing that the optical disk is in a flat state) to a point where the surface vibration of the optical disk 1 becomes substantially stable (step S401-4). Then, the z-axis pickup position control portion 51 performs adjustment in the z-axis direction of the optical pickup 6, so that a provisional focus position of the optical pickup 6 would match to the surface center position O of the stabilizing member 8 (step S401-5). In such step where the provisional focus position of the optical pickup 6 is matched to the surface center position O of the stabilizing member 8, the focus position of the pickup can be set at a position substantially at a center of a range of fluctuation within which the optical disk fluctuates in a rotary axial direction. Subsequently, the focus servo is switched on (step S401-6), and then the tracking servo is switched on (step S401-7).

Subsequently, the CPU monitors the residual focus error signal of the focus servo and analyzes the property thereof, to thereby, adjust and control the positional relation between the optical disk 1 and the stabilizing member 8 according to the value obtained from the property analysis (S401-8, S401-9). That is, the stabilizing member 8 has a tilt angle thereof being adjusted by moving the y-axis stabilizing member tilt angle control portion 55, so that the maximum amplitude of the residual focus error signal becomes no more than 0.5 V.

By constantly monitoring and adjusting the surface vibration, and repeating the steps such as (S401-8) and (S401-9) after performing the aforementioned adjustment, surface vibration at the focus position of the optical pickup can be controlled to a constant stable state, even when there is a change in parameter (e.g. radial position of the optical disk 1 at which recording/reproducing is performed, number of rotations of the optical disk) that influences the position at which surface vibration is stabilized. Thereby, for example, recording/reproducing can be performed continuously and constantly while moving a radial position of the optical disk 1 at which recording/reproducing is performed.

Even without constantly monitoring and adjusting the surface vibration of the optical disk 1, surface vibration of the optical disk 1 occurring at the focus position of the optical pickup 6 can be stabilized any time by performing the steps (S401-8) and (S401-9). The manner in which recording/reproducing is performed is variable, and is not to be restricted to the aforementioned embodiment.

It is to be noted that the standard value of the maximum amplitude of the residual focus error signal being 0.5V is a prescribed value determined according to the relation between the residual focus error signal and the amount of surface vibration of the disk, in which the value equals to a surface vibration amount of 0.2 micrometers. The aforementioned standard value is only an example, and may be respectively determined in accordance with various kinds of optical pickups. It is to be noted that the surface vibration standard value of 0.2 micrometers is a value set according to an amount of defocus required for an optical pickup of 0.8 NA.

Same as the tenth embodiment, performing such adjustment and control enables the position of the surface vibration stabilizing area for the stabilizing member 8 to be determined with ease and with precision, thereby recording/reproducing can be performed while making the most of the advantages using Bernoulli's law for stabilizing surface vibration of the flexible optical disk 1.

In means to confirm the surface vibration adjusting effect of the eleventh embodiment, a surface vibration grading test using a laser displacement meter was conducted upon the optical pickup side of the optical disk 1a at a radial position of 40 mm and at a rotating speed of 3100 rpm. Results of the test revealed that surface vibration can be controlled to 4 micrometers or less, thereby proving effectiveness of the present invention. Furthermore, the aforementioned test was conducted for the eleventh embodiment under the conditions where parameters (e.g. radial position of the grading target, rotation count of the disk, specifications of the disk) were altered within a practical range. Results of the test revealed that a constant stabilized surface vibration can be ensured on the optical pickup side of the optical disk 1, in which the surface vibration was no more than 5 micrometers.

A twelfth embodiment of the present invention will be described hereinafter. Since the optical disk apparatus of the twelfth embodiment has the same structure as that of the tenth embodiment, the drawing of the optical disk of the twelfth embodiment will be omitted. In the twelfth embodiment, the three dimensional position of the stabilizing member 8 for stabilizing surface vibration is estimated beforehand based on detected focus error signals relative to the radial position of the disk for recording/reproducing, the rotation count of the disk, and other specifications of the disk, thereby, an estimated value A, which serves as data for a preparatory positional movement of the stabilizing member 8, is stored into the memory of the CPU mounted on the optical disk apparatus.

Figure 22:
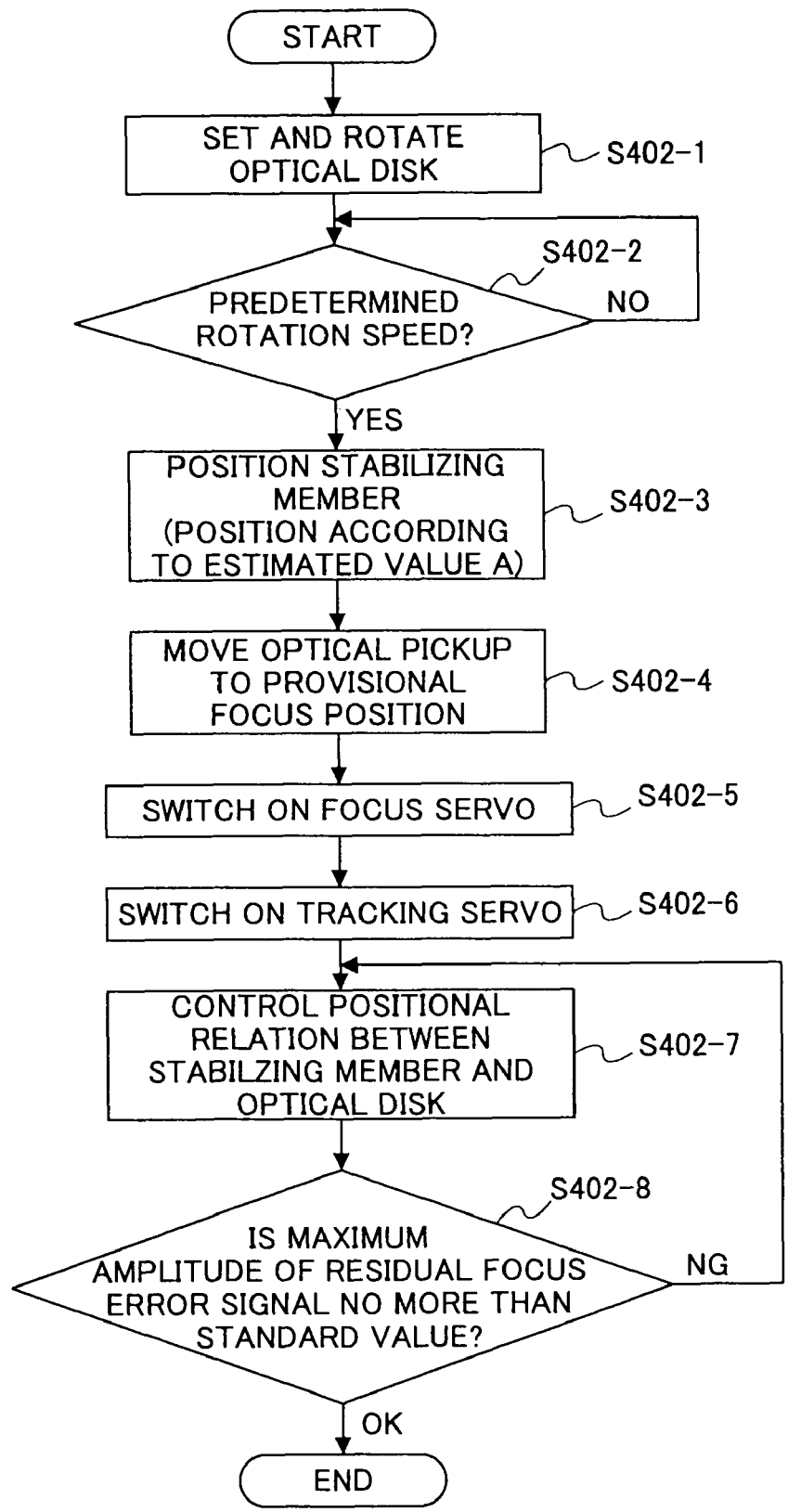
FIG. 22 is a flow chart regarding a control-adjustment operation for stabilizing surface vibration according to the twelfth embodiment of the present invention.

Adjustment and control for stabilizing surface vibration with a CPU for the twelfth embodiment will be explained with reference to the flow chart shown in FIG. 22.

When a start signal is inputted into a CPU (central processing unit), the spindle motor 4 starts and rotates the optical disk 1 (step S402-1). When the optical disk 1 reaches a predetermined rotation speed (YES in step S402-2), the stabilizing member 8 is moved in a radial direction of the optical disk 1, the estimated value A is read out, and the stabilizing member 8 is three dimensionally positioned with respect to the optical disk 1 (step S402-3). The stabilizing member/pickup space adjusting portion 45 performs adjustment so that a provisional focus position of the optical pickup 6 would match with the surface center position O of the stabilizing member 8 (step S402-4). Subsequently, the focus servo is switched on (step S402-5), and then the tracking servo is switched on (step S402-6).

Subsequently, the CPU monitors the residual focus error signal and analyzes the property thereof, to thereby, adjust and control the positional relation between the optical disk 1 and the stabilizing member 8 according to the value obtained from the property analysis (S402-7, S402-8). That is, the stabilizing member 8 has a z-axis position and a tilt angle thereof being adjusted by moving and slightly adjusting the z-axis stabilizing member/pickup unit position control portion 40, the x-axis stabilizing member/pickup unit tilt angle control portion 42, and the y-axis stabilizing member/pickup unit tilt angle control portion 43, so that a maximum amplitude of the residual focus error signal becomes no more than 0.5 V.

Same as the tenth embodiment, performing such adjustment and control enables surface vibration to be stabilized, and also enables initial setting of the stabilizing member 8 to be simplified.

Although the twelfth embodiment roughly estimates the initial movement for setting the position of the stabilizing member 8 with respect to each optical disk 1, the estimate is not required to correspond to all parameters, but requires typical parameters such as the material of the disk, the thickness of the disk, or the type of composing layers of the disk, and requires to prepare only a number of positions for the preparatory movement of the stabilizing member 8.

It is to be noted that the same surface vibration stabilizing effect of the stabilizing member 8 has been observed by using the adjustment and control method in a case where an optical disk using polyethylene terephthalate is employed as the material for the sheet-like optical disk 1.

Therefore, as explained above, the state of stabilizing surface vibration on the pickup side of the optical disk 1 can be precisely determined according to the residual focus error signal, the focal point position of the optical pickup 6 and the stabilized position on the optical disk 1 can be matched by adjusting the positional relation between the optical disk and the stabilizing member, and the value of surface vibration occurring at a position of the optical disk at which recording/reproducing is performed can be reduced considerably, to thereby enable easy correspondence to a high NA optical pickup having narrow defocus margin and narrow work distance, and enable steady recording and/or reproduction.

Further, the present invention is not limited to these embodiments, but various variations and modifications may be made without departing from the scope of the present invention.

The present application is based on Japanese priority applications Nos. 2002-012717, 2002-180095, 2002-187360, and 2002-239015 filed on Jan. 22, 2002, Jun. 20, 2002, Jun. 27, 2002, and Aug. 20, 2002, respectively, with the Japanese Patent Office, the entire contents of which are hereby incorporated by reference.

What is claimed is:

1. An optical disk apparatus, comprising:
    a rotary driving unit rotating an optical disk which is flexible;
    an optical pickup irradiating light upon a recording layer of the optical disk on which writing/reading of information is performed;
    a stabilizing unit configured to stabilize vibration of the optical disk in a rotary axial direction at least on a portion where writing/reading is performed by moving toward the portion where the writing/reading is performed;
    a focus error detection unit which detects a focus error signal for use in servo control of a focus position of the optical pickup; and
    a control-adjustment unit analyzing a residual focus error signal that is detected by the focus error detection unit to indicate the focus error remaining despite the servo control, and adjusting a positional relation between the optical disk and the stabilizing unit in a three dimensional space according to a value obtained by analyzing the residual focus error signal.

2. The optical disk apparatus as claimed in claim 1, wherein the control-adjustment unit adjusts the positional relation between the optical disk and the stabilizing unit in a three dimensional space such that vibration of the optical disk in a rotary axial direction is no more than a predetermined standard value when a maximum amplitude of the residual focus error signal corresponding to a single rotation of the optical disk is converted into said vibration of the optical disk in a rotary axial direction.

3. The optical disk apparatus as claimed in claim 1, wherein the standard value is a defocus margin predetermined for sufficiently performing recording/reproduction according to a combination of the optical pickup and the optical disk.

4. The optical disk apparatus as claimed in claim 1, further comprising a shifting unit for shifting at least one of a position of the optical disk and a position of the stabilizing unit according to a signal transmitted from the control-adjustment unit for adjusting the positional relation between the optical disk and the stabilizing unit.

5. A method of controlling an optical disk apparatus, comprising the steps of:
    rotating an optical disk which is flexible;
    irradiating light from an optical pickup to a recording layer of the optical disk on which writing/reading of information is performed;
    stabilizing vibration of the optical disk occurring in a rotary axial direction with a stabilizing unit at least on a portion where writing/reading is performed, wherein the step of stabilizing vibration of the optical disk comprises the step of moving the stabilizing unit toward the portion where writing/reading is performed;

detecting a focus error signal with a focus error detection unit for use in servo control of a focus position of the optical pickup;

analyzing a residual focus error signal that is detected by the focus error detection unit to indicate the focus error remaining despite the servo control; and adjusting a positional relation between the optical disk and the stabilizing unit in a three dimensional space according to a value obtained by analyzing the residual focus error signal.

6. The method of controlling an optical disk apparatus as claimed in claim 5, wherein the positional relation between the optical disk and the stabilizing unit in a three dimensional space is adjusted such that the maximum amplitude of the residual focus error signal is no more than a standard value which is predetermined.

7. The method of controlling an optical disk apparatus as claimed in claim 6, wherein the standard value is a defocus margin predetermined for sufficiently performing recording/reproduction according to a combination of the optical pickup and the optical disk.

8. The method of controlling an optical disk apparatus as claimed in claim 5, wherein said flexible disk has a thickness of approximately 0.1 mm.

9. The method of controlling an optical disk apparatus as claimed in claim 5, wherein said flexible optical disk is located between said optical pickup and said stabilizing unit during said step of stabilizing said vibration.

10. The method of controlling an optical disk apparatus as claimed in claim 5, wherein said step of adjusting said positional relation includes the step of adjusting the position of said stabilizing unit.

11. The method of controlling an optical disk apparatus as claimed in claim 5, further comprising the step of adjusting a rotating condition of said optical disk while rotating said disk at a constant rate of rotation.

12. A method of controlling an optical disk apparatus, comprising the steps of:

a) rotating an optical disk which is flexible;

b) irradiating light from an optical pickup to a recording layer of the optical disk on which writing/reading of information is performed;

c) stabilizing vibration of the optical disk occurring in a rotary axial direction with a stabilizing unit at least on a portion where writing/reading is performed, wherein the step c) comprises the step of moving the stabilizing unit toward the portion where writing/reading is performed;

d) detecting a focus error signal with a focus error detection unit for use in servo control of a focus position of the optical pickup;

e) analyzing a residual focus error signal that is detected by the focus error detection unit to indicate the focus error remaining despite the servo control;

f) adjusting a positional relation between the optical disk and the stabilizing unit in a three dimensional space according to a value obtained by analyzing the residual focus error signal;

g) predetermining a standard condition for three-dimensionally adjusting a positional relation between the optical disk and the stabilizing member by applying the steps a) to f) to various optical disks having different specifications; and h) applying the steps a) to f) according to a given optical disk according to a corresponding one of the predetermined standard conditions.

13. The method of controlling an optical disk apparatus according to claim 12, wherein the step h) comprises a step of performing the steps a) to f) and a step of performing the steps a) to f) according to the standard condition as fine adjustment.

14. The method of controlling an optical disk apparatus as claimed in claim 12, wherein the positional relation between the optical disk and the stabilizing unit in a three dimensional space is adjusted such that the maximum amplitude of the residual focus error signal is no more than a standard value which is predetermined.

15. The method of controlling an optical disk apparatus as claimed in claim 14, wherein the standard value is a defocus margin predetermined for sufficiently-performing recording/reproduction according to a combination of the optical pickup and the optical disk.

* * * * *